United States Patent
Li et al.

(10) Patent No.: US 10,531,406 B2
(45) Date of Patent: Jan. 7, 2020

(54) CONTEXT AND POWER CONTROL INFORMATION MANAGEMENT FOR PROXIMITY SERVICES

(71) Applicant: Convida Wireless, LLC, Wilmington, DE (US)

(72) Inventors: Qing Li, Princeton, NJ (US); Paul L. Russell, Jr., Pennington, NJ (US); Chonggang Wang, Princeton, NJ (US); Zongrui Ding, San Diego, CA (US); Hongkun Li, King of Prussia, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 14/303,228

(22) Filed: Jun. 12, 2014

(65) Prior Publication Data
US 2014/0372774 A1  Dec. 18, 2014

Related U.S. Application Data

(60) Provisional application No. 61/834,335, filed on Jun. 12, 2013, provisional application No. 61/834,341, (Continued)

(51) Int. Cl.
*H04W 52/38* (2009.01)
*H04L 12/931* (2013.01)
(Continued)

(52) U.S. Cl.
CPC ............ *H04W 52/383* (2013.01); *G06F 1/26* (2013.01); *G06F 1/28* (2013.01); *H04L 49/405* (2013.01);
(Continued)

(58) Field of Classification Search
CPC ....... H04B 7/0628; H04B 7/02; H04L 1/0026; H04L 27/2601; H04W 24/02; H04W 88/08; H04W 52/24
(Continued)

(56) References Cited

U.S. PATENT DOCUMENTS 7,352,770 B1    4/2008  Yonge et al.
7,469,297 B1   12/2008  Kostoff et al.
(Continued)

FOREIGN PATENT DOCUMENTS

CN         1989703 A     6/2007
CN       101795500 A     8/2010
(Continued)

OTHER PUBLICATIONS

International Application No. PCT/US2014/046193: International Search Report and Written Opinion dated Nov. 28, 2014, 8 pages.
(Continued)

*Primary Examiner* — Robert E Fennema
*Assistant Examiner* — Santosh R Poudel
(74) *Attorney, Agent, or Firm* — BakerHostetler

(57) ABSTRACT

Management of context and power control information enables different power control schemes for point-to-point or point-to-multipoint based on proximity services or applications. Context information may be defined as situation data about a service or application that is used to help define a power control scheme to be implemented. Power control information may be defined as control or status data for power control, which can be used for reporting or controlling the transmitting power of a peer in a P2P network. Context and power control information may be managed across multiple layers such as the application layer, service layer, media access control layer, or physical layer. Context and power control information is updated and exchanged
(Continued)

between or among peers for context-related power control in proximity services.

20 Claims, 15 Drawing Sheets

Related U.S. Application Data filed on Jun. 12, 2013, provisional application No. 61/837,993, filed on Jun. 21, 2013.

(51) Int. Cl.
*G06F 1/28* (2006.01)
*G06F 1/26* (2006.01)
*H04W 52/08* (2009.01)
*H04W 52/10* (2009.01)
*H04W 52/24* (2009.01)
*H04W 52/26* (2009.01)
*H04W 52/28* (2009.01)
*H04W 52/32* (2009.01)
*H04W 52/36* (2009.01)

(52) U.S. Cl.
CPC ............ *H04W 52/08* (2013.01); *H04W 52/10* (2013.01); *H04W 52/242* (2013.01); *H04W 52/243* (2013.01); *H04W 52/244* (2013.01); *H04W 52/262* (2013.01); *H04W 52/265* (2013.01); *H04W 52/267* (2013.01); *H04W 52/281* (2013.01); *H04W 52/282* (2013.01); *H04W 52/283* (2013.01); *H04W 52/322* (2013.01); *H04W 52/325* (2013.01); *H04W 52/327* (2013.01); *H04W 52/367* (2013.01)

(58) Field of Classification Search
USPC ......................................................... 713/300
See application file for complete search history.

(56) References Cited

U.S. PATENT DOCUMENTS

| | | | |
|---|---|---|---|
| 7,660,860 B2 | 2/2010 | Yoon et al. | |
| 7,730,208 B2 | 6/2010 | Saha | |
| 7,756,082 B1 | 7/2010 | Dhamdhere | |
| 7,787,397 B2 | 8/2010 | Olvera-Hernandez | |
| 8,041,380 B2 | 10/2011 | Hamdi et al. | |
| 8,175,627 B2 | 5/2012 | Shon et al. | |
| 8,285,319 B2* | 10/2012 | Shin | H04W 52/08 455/522 |
| 8,315,564 B2 | 11/2012 | Banerjea | |
| 8,363,586 B2 | 1/2013 | Rosario et al. | |
| 8,738,093 B1 | 5/2014 | Gopalakrishnan et al. | |
| 8,880,009 B2 | 11/2014 | Baldessari et al. | |
| 8,892,032 B2 | 11/2014 | Madhukar et al. | |
| 8,958,838 B2 | 2/2015 | Patel et al. | |
| 9,098,177 B2 | 8/2015 | Das | |
| 9,210,085 B2 | 12/2015 | Harrison | |
| 9,232,393 B2 | 1/2016 | Van et al. | |
| 2002/0132586 A1* | 9/2002 | Chen | H04W 68/02 455/69 |
| 2002/0159395 A1* | 10/2002 | Nelson, Jr. | H04W 72/1289 370/252 |
| 2003/0212822 A1 | 11/2003 | Saha et al. | |
| 2003/0212827 A1 | 11/2003 | Saha | |
| 2005/0068916 A1* | 3/2005 | Jacobsen | H04L 1/0001 370/328 |
| 2005/0193106 A1 | 9/2005 | Desai et al. | |
| 2006/0009159 A1* | 1/2006 | Leung | H04L 12/2697 455/67.11 |
| 2006/0013256 A1 | 1/2006 | Lee et al. | |
| 2006/0166690 A1* | 7/2006 | Nishio | H04W 52/322 455/522 |
| 2006/0248525 A1 | 11/2006 | Hopkins | |
| 2006/0253736 A1 | 11/2006 | Rudolf et al. | |
| 2007/0005775 A1 | 1/2007 | Philips | |
| 2007/0104116 A1 | 5/2007 | Olvera-Hernandez | |
| 2007/0115829 A1* | 5/2007 | Strutt | H04W 52/24 370/238 |
| 2007/0253352 A1 | 11/2007 | Arisha et al. | |
| 2008/0055068 A1 | 3/2008 | Van Wageningen et al. | |
| 2008/0068217 A1 | 3/2008 | Van Wyk et al. | |
| 2008/0134271 A1* | 6/2008 | Qin | H04W 52/50 725/118 |
| 2008/0170541 A1* | 7/2008 | Vartiainen | H04W 52/322 370/328 |
| 2008/0268892 A1* | 10/2008 | Hamdi | H04W 52/283 455/522 |
| 2009/0029650 A1* | 1/2009 | Shon | H04L 1/188 455/68 |
| 2009/0104875 A1 | 4/2009 | Naniyat | |
| 2009/0204354 A1 | 8/2009 | Davis et al. | |
| 2009/0213774 A1* | 8/2009 | Chapman | H04W 36/30 370/312 |
| 2009/0311961 A1* | 12/2009 | Banerjea | H04W 52/50 455/41.2 |
| 2009/0325484 A1 | 12/2009 | LeLe | |
| 2010/0103870 A1 | 4/2010 | Garcia-Luna-Aceves et al. | |
| 2010/0110999 A1 | 5/2010 | Li et al. | |
| 2010/0150027 A1* | 6/2010 | Atwal | H04W 16/18 370/254 |
| 2010/0153562 A1 | 6/2010 | Burr | |
| 2010/0165961 A1 | 7/2010 | Rosario | |
| 2010/0198459 A1 | 8/2010 | Kosai et al. | |
| 2010/0232333 A1* | 9/2010 | Higuchi | H04L 1/0003 370/312 |
| 2010/0233963 A1* | 9/2010 | Harada | H04W 16/14 455/63.3 |
| 2010/0235925 A1 | 9/2010 | Lee | |
| 2010/0248727 A1 | 9/2010 | Karaoguz et al. | |
| 2010/0323717 A1* | 12/2010 | Agashe | G01S 1/68 455/456.1 |
| 2011/0082939 A1 | 4/2011 | Montemurro et al. | |
| 2011/0117852 A1 | 5/2011 | Copeland et al. | |
| 2011/0173331 A1 | 7/2011 | Setton et al. | |
| 2011/0182280 A1 | 7/2011 | Charbit | |
| 2011/0201275 A1 | 8/2011 | Jabara et al. | |
| 2011/0225368 A1 | 9/2011 | Burge, III | |
| 2012/0135778 A1* | 5/2012 | Tian | H04L 1/0003 455/522 |
| 2012/0142392 A1* | 6/2012 | Patel | H04W 52/143 455/522 |
| 2012/0155349 A1 | 6/2012 | Bajioc | |
| 2012/0184321 A1* | 7/2012 | Baldessari | H04W 52/267 455/522 |
| 2012/0201158 A1 | 8/2012 | Geirhofer et al. | |
| 2012/0224484 A1 | 9/2012 | Babiarz et al. | |
| 2012/0258741 A1* | 10/2012 | Tillson | G01S 3/046 455/457 |
| 2012/0296995 A1 | 11/2012 | Yan | |
| 2012/0314600 A1 | 12/2012 | Zeira | |
| 2013/0034064 A1 | 2/2013 | Nam et al. | |
| 2013/0044681 A1* | 2/2013 | Abraham | H04L 1/0002 370/328 |
| 2013/0058288 A1* | 3/2013 | Nentwig | H04J 11/0023 370/329 |
| 2013/0077661 A1 | 3/2013 | Jacobsen et al. | |
| 2013/0148517 A1* | 6/2013 | Abraham | H04B 7/12 370/252 |
| 2013/0250931 A1* | 9/2013 | Abraham | H04W 8/005 370/338 |
| 2013/0288601 A1 | 10/2013 | Chhabra | |
| 2013/0297810 A1 | 11/2013 | Ho et al. | |
| 2013/0317892 A1 | 11/2013 | Heerboth | |
| 2014/0105186 A1 | 4/2014 | Park et al. | |
| 2014/0108868 A1 | 4/2014 | Neerincx et al. | |
| 2014/0126655 A1* | 5/2014 | Vijayasankar | H04B 3/54 375/257 |
| 2014/0153500 A1* | 6/2014 | Duan | H04W 52/265 370/329 |

(56) References Cited

U.S. PATENT DOCUMENTS

| | | | |
|---|---|---|---|
| 2014/0173447 A1 | 6/2014 | Das | |
| 2014/0359148 A1* | 12/2014 | Cherian | H04L 41/28 709/229 |
| 2014/0372774 A1 | 12/2014 | Li et al. | |
| 2014/0372775 A1 | 12/2014 | Li et al. | |
| 2015/0133083 A1* | 5/2015 | Van Phan | H04L 63/068 455/411 |
| 2015/0223111 A1* | 8/2015 | Lindoff | H04W 24/02 370/252 |
| 2016/0295521 A1* | 10/2016 | Grayson | H04W 4/02 |

FOREIGN PATENT DOCUMENTS

| | | |
|---|---|---|
| CN | 102165840 A | 8/2011 |
| CN | 102695131 A | 9/2012 |
| CN | 102893589 A | 1/2013 |
| CN | 103037489 A | 4/2013 |
| EP | 2701457 A1 | 2/2014 |
| FR | 2 910 764 | 6/2008 |
| JP | 2001-308786 A | 11/2001 |
| JP | 2005-057602 A | 3/2005 |
| JP | 2006-050510 A | 2/2006 |
| JP | 2006-054707 A | 2/2006 |
| JP | 2006-148914 A | 6/2006 |
| JP | 2007-150745 A | 6/2007 |
| JP | 2008-077421 A | 4/2008 |
| JP | 2008-538465 A | 10/2008 |
| JP | 2009-038659 A | 2/2009 |
| JP | 2009-536002 A | 10/2009 |
| JP | 2009-538465 A | 11/2009 |
| JP | 2010-130096 A | 6/2010 |
| JP | 2010-165351 A | 7/2010 |
| JP | 2010-183178 A | 8/2010 |
| JP | 2011-014022 A | 1/2011 |
| JP | 2011-239210 A | 11/2011 |
| JP | 2012-147146 A | 8/2012 |
| JP | 2014-527750 A | 10/2014 |
| KR | 10-2010-0080406 A | 7/2010 |
| KR | 10-2011-0093870 A | 8/2011 |
| WO | 2006/110492 A2 | 10/2006 |
| WO | 2007/130883 A2 | 11/2007 |
| WO | 20111153269 A1 | 12/2011 |
| WO | 2012/144707 A1 | 10/2012 |
| WO | 2013/022244 A2 | 2/2013 |
| WO | 2014/186261 | 11/2014 |
| WO | 2014/205370 A1 | 12/2014 |
| WO | WO 2014-201240 | 12/2014 |
| WO | WO 2014-201251 | 12/2014 |
| WO | WO 2015-006585 | 1/2015 |

OTHER PUBLICATIONS

International Application No. PCT/US2014/043449: International Search Report and Written Opinion dated Nov. 24, 2014, 8 pages.
3rd Generation Partnership Project (3GPP); S1-120059, "Suggested D2D Terminologies (Operator Managed, Operator Assisted, Operator Free)", 3GPP TSG-SA WG1 Meeting #57, Kyoto, Japan, Feb. 13-17, 2012, 3 pages.
3rd Generation Partnership Project (3GPP); TR 22.803 V0.2 .0; 3rd Generation Partnership Project; Technical Specification Group SA; Feasibility Study for Proximity Services (ProSe), (Release 12), Feb. 2012, 18 pages.
Ersue et al, "Management of Networks with Constrained Devices: Use Cases draft-ietf-opsawg-coman-use-cases-01", The Internet Engineering Task Force(IETF), Feb. 14, 2014, 30 pages.
Heile et al, "Wireless Medium Access Control (MAC) and Physical Layer (PHY) Specifications for Peer Aware Communications(PAC)", IEEE P802.15.8, Feb. 8, 2012, 2 pages.
International Application No. PCT/US2014/042107: International Search Report dated Oct. 28, 2014, 6 pages.
International Application No. PCT/US2014/042128: International Search Report dated Oct. 28, 2014, 6 pages.
Lee, M., "Peer Aware Communications (PAC) Study Group 5 Criteria", IEEE P802.15-12-0064-01, Jan. 20, 2012, 4 pages.
Liu et al, "MAC Proposals for Low Energy Critical Infrastructure Networks", IEEE 802.15.4k, Jul. 18, 2011, 13 pages.
Meyer,D. and Feamster, N., "Proto-SDNRG Meeting", IETF 84, Apr. 2012.
Shelby et al, "Constrained Application Protocol (CoAP) draft-shelby-core-coap-01", The Internet Engineering Task Force(IETF), May 10, 2010, 33 pages.
Lee, M., "PAC Introduction", IEEE 802.15-12-0004-01-0pac, Jan. 18, 2012, 20 pages.
Liu et al, "Consideration on MAC Enhancement of IEEE 802.15. 4-2006", IEEE, Jul. 6, 2007, 9 pages.
IEEE Standard for Local and Metropolitan Area Networks—Part 15.4: Low-Rate Wireless Personal Area Networks (LR-WPANs), IEEE Std 802.15.4-2011, Sep. 5, 2011, 314 pages.
Japanese Application No. 2016-519649: Notice of Reasons for Rejection dated Dec. 28, 2016, 8 pages.
Kwak et al, "Proposed Text on Transmit Power Control for TGD", IEEE 15-13-0020-00-0008, P802.15, Jan. 11, 2013, https://mentor.ieee.org/802.15/dcn/13/15-13-0020-00-0008-proposed-text-on-transmit-power-control-for-tgd.pptx.
Park, Seung-Hoon, "TG8 Technical Guidance Document", IEEE, P802.15 Wireless Personal Area Networks, Mar. 19, 2013, https://mentor.ieee.org/802.15/dcn/12/15-120568-05-0008-tg8-technical-guidance-document.docx.
IEEE 802.154k, IEEE Standard for Local and metropolitan area networks—"Part 15.4: Low-Rate Wireless Personal Area Networks (LR-WPANs) Amendment 5: Physical Layer Specifications for Low Energy, Critical Infrastructure Monitoring Networks", Jun. 14, 2013, 149 pages.
Yedavalli, K. and Krishnamachari, B., "Enhancement of the IEEE 802.15.4 MAC Protocol for Scalable Data Collection in Dense Sensor Networks", 2006, 10 pages.
Lee, M., IEEE P802.15 "PAC Introduction", Jan. 2012, 20 pages.
Ho, Some Proposed Changes to IEEE P802.15.6/D01 MAC and Security Subclasses, IEEE 802.15-10/0678r0, IEEE, Oct. 2010, pp. 19-28, searched date Aug. 9, 2018.
English Translation of JP Office Action dated Sep. 11, 2018 for JP Application No. 2017233480.
English Translation of JP Office Action dated Aug. 15, 2018 for JP Application No. 2017224729.

* cited by examiner

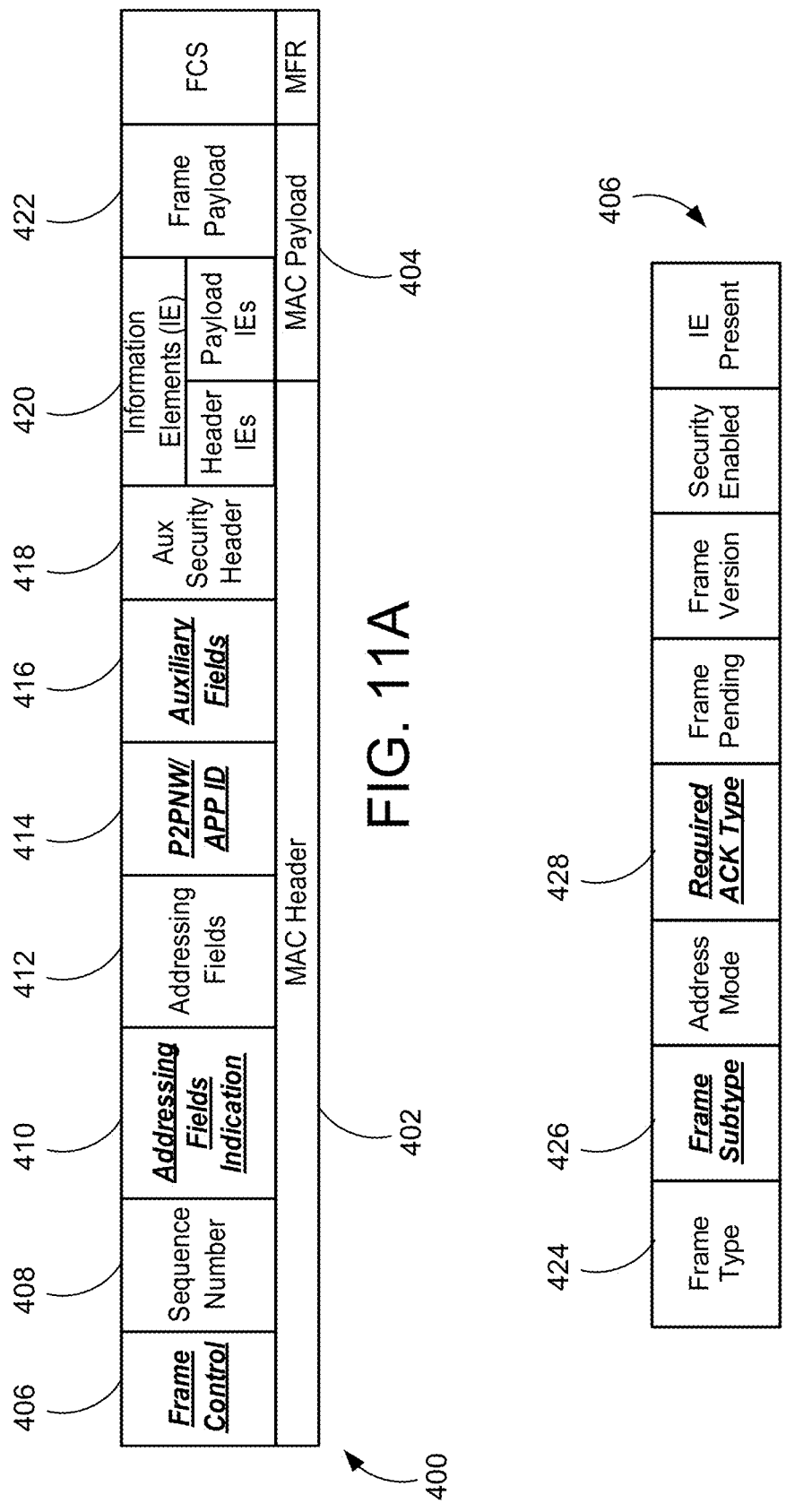

CONTEXT AND POWER CONTROL INFORMATION MANAGEMENT FOR PROXIMITY SERVICES

CROSS REFERENCE TO RELATED APPLICATIONS

This application claims benefit under 35 U.S.C. § 119(e) of Provisional U.S. Patent Application No. 61/834,335, filed Jun. 12, 2013, of Provisional U.S. Patent Application No. 61/834,341, filed Jun. 12, 2013, and of Provisional U.S. Patent Application No. 61/837,993, filed Jun. 21, 2013, the contents of all three of which are incorporated herein by reference in their entirety.

BACKGROUND

The Internet of Things (IoT) introduces objects or things to Human-to-Human (H2H) based Internet services. It marks a stage of the Internet where physical or virtual objects are interconnected to enable the Internet of Services (IoS). Many of these services are proximity based, such as smart shopping, smart home, smart office, smart health, smart transportation, smart parking, smart grid, and smart city, among other things.

Proximity services may be based on peer-to-peer (P2P) communications in proximity. P2P devices include tablets, smart phones, music players, game consoles, personal digital assistances, laptops/PCs, medical devices, connected cars, smart meters, sensors, gateways, monitors, alarms, set-top boxes, printers, Google glasses, drones, and service robots, among other things. A P2P communication system may be a central system with a controller or core network serving as an infrastructure, or a distributed system without a controller or core network serving as the infrastructure. Proximity services may include human-to-human (H2H) proximity services, machine-to-machine (M2M) proximity services, machine-to-human (M2H) proximity services, human-to-machine (H2M) proximity services, and network of network proximity services.

Proximity-based applications and services represent a trend to offload heavy local internet traffic from a core infrastructure as well as provide the connections to an infrastructure via multi-hopping. Many standards have identified proximity services use cases as part of their standardization working groups, such as 3GPP, oneM2M, IETF, IEEE, and OMA. Service layer, as well as cross-layer techniques, is an area of standardization to enable these services.

Proximity services may use wireless networks that have varying transmit power schemes. 3G or 4G wireless systems may use centralized control and implement open loop transmit power control (TPC) or closed loop TPC. Centralized control entails control between a central controller (e.g., base station, NodeB, or eNodeB) and a point (e.g., mobile station or user equipment). Open loop TPC allows for the power level to be adjusted based on the power target set by the central controller and the measured channel path loss. Closed loop TPC allows for the power level to be adjusted from the previous power level (open loop power setting) based on the received signal quality and the power control bit(s) or command(s). WiMax IEEE 802.16 network TPC schemes are very similar to cellular systems with both open loop and closed loop power control. Bluetooth is an infrastructure-less short-range wireless system with a master node and up to seven slave nodes with static transmitting power (typically around 20 dBm).

SUMMARY

Context information and power control information (CPCI) may be managed to enable proximity services with different context-related power control procedures. The context-related power control procedures may include CPCI detection, context-related inter-P2PNW power control, or context-related intra-P2PNW power control.

In an embodiment, a device may receive an indication of preparation for a transmission associated with a first proximity service of a peer-to-peer wireless network, wherein the first proximity service is operating on the device. Responsive to receiving the indication, the device receives default context information for the first proximity service operating on the device. The device scans wireless channels and also receives context information from one or more peer devices. The device determines its transmit power based on the default context information and the first context information.

In another embodiment, a device receives a power control response comprising CPCI associated with a proximity service of a peer device. The context-related power control is executed to determine the transmit power based on the CPCI associated with the proximity service of the peer device and the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 11A illustrates an exemplary, non-limiting modified and/or extended general MAC frame format according to an embodiment;

FIG. 11B illustrates an exemplary, non-limiting frame control field format according to an embodiment;

DETAILED DESCRIPTION

Figure 1:
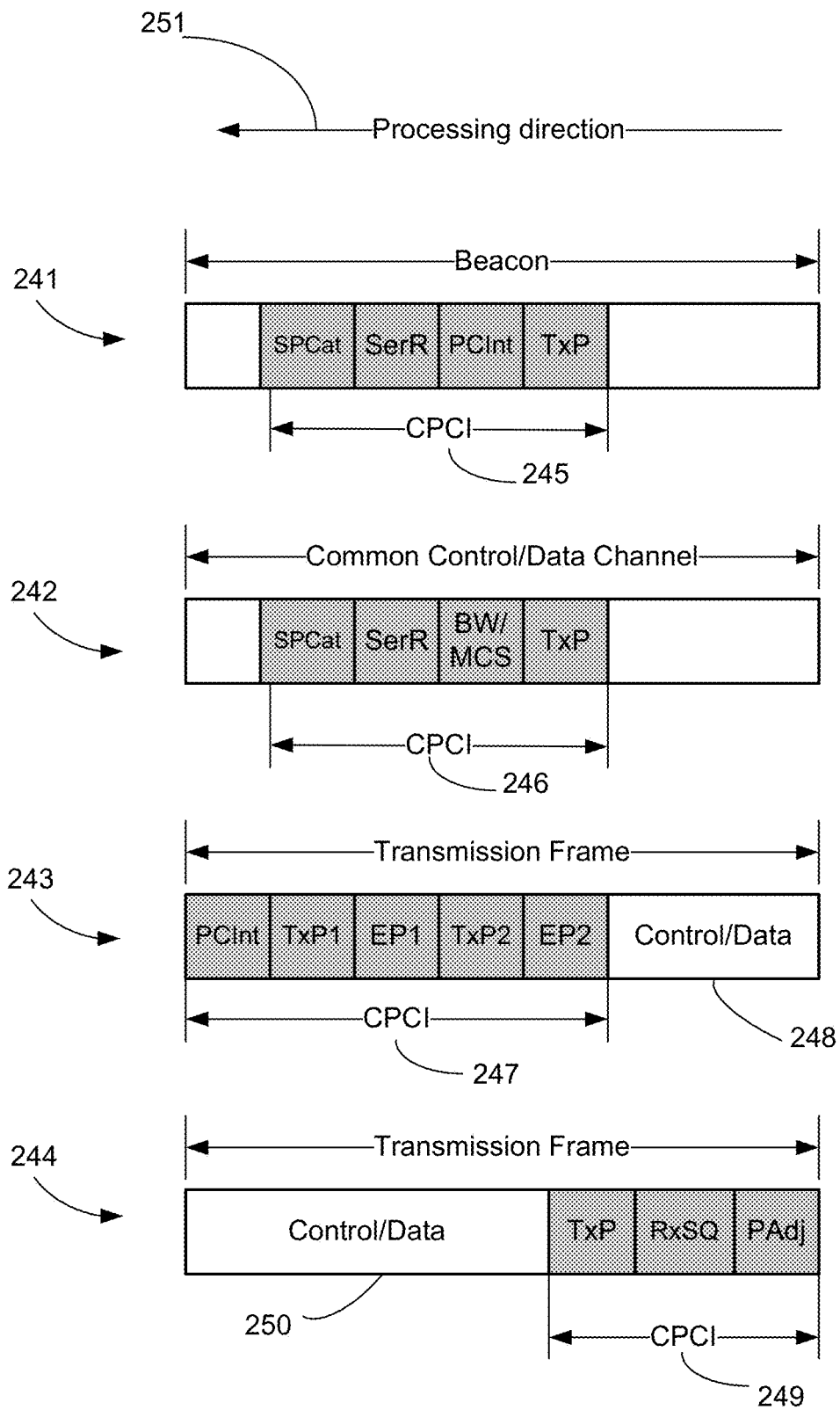
FIG. 1 illustrates examples of how CPCI may be communicated.

Conventional power control schemes implemented or proposed by other wireless communication systems, such as 3GPP, WiMax 802.16, WiFi 802.11, WPAN 802.15, and Bluetooth, among others, do not support managing context information and power control information (hereinafter CPCI) for power control schemes with regard to proximity services (ProSs), as discussed herein. Disclosed herein are approaches for context-related power control management that may include, but are not limited to, the management of CPCI for an infrastructure-less system (e.g., inter-P2PNWs and intra-P2PNW), the management of CPCI for multi-service at a peer (e.g., multiple ProSs used at the same time), or the management of CPCI for point-to-multipoint communications when using multicast communications.

Wireless peer-to-peer networks (P2PNWs) may be formed for proximity services (ProSs). Proximity may be considered a relatively small area in which the peers can communicate with each other, usually via direct or multi-hopped radio signals. Different ProS P2PNWs use different power control schemes. For example, the power control scheme for a gaming ProS P2PNW with peers inside a few meters may not emphasize path loss compensation for the near-far problem or frequent power adjustments due to mobility. Whereas a ProS P2PNW within a department store for personalized advertisement may require path loss compensation for the near-far problem and frequent power adjustments due to mobility.

Many ProS P2PNWs coexist within a short radio range of each other without a central controller to manage the ProS devices among the ProS P2PNWs (e.g., inter-P2PNWs) and within the ProS P2PNWs (e.g., intra-P2PNWs). ProS P2PNWs that are in radio range are vulnerable to interferences caused by other nearby ProS P2PNWs. CPCI may be used to help in the management of power control for inter-P2PNWs and intra-P2PNWs and therefore minimize the interference among different ProS P2PNWs as well as within a P2PNW.

A device may engage in multiple ProSs at the same time and different ProSs may have different requirements for power control. Therefore, context-related power control information management for multiple applications or services on a device may be used to support multiple proximity services at the same time. ProSs as discussed herein may refer to applications or services.

ProS P2PNWs are formed in proximity with the desired contexts, such as services, users, devices, service range, location, etc., between two peers (pair communication) or among peers (group communication). For example, at a shopping mall, there may be P2PNWs for social connection, P2PNWs for streaming or content exchange, P2PNWs for broadcasting or multicasting stores' promotions or personalized advertisements, and P2PNWs for gaming, among other things. These ProS P2PNWs have different requirements for power control due to the required QoS of each service. Therefore, an effective power control scheme may be defined by catering to the particular service or context. CPCI based on services or context enables different power control schemes for different ProS P2PNWs.

ProS-based context information generally may be defined as situation data about a service or application that is used to help define a power control scheme to be implemented. For example, as briefly shown in Table 1, context information may include information, such as a service power category (SPcat), service range (SerR), power control interval (PCInt), bandwidth (BW), data rate (DR), modulation and coding scheme (MCS), latency (Lat), location (Loc), speed (Sd), or the like. Each type of ProS-based context information listed in Table 1 is described in more detail below.

TABLE 1

| Proximity Service Based Context Information | Description |
| --- | --- |
| Service Power Category (SPcat) | Classification of power control requirements |
| Service Range (SerR) | Service radio range for a ProS P2PNW |
| Bandwidth (BW) | Bandwidth allocated for a peer |
| Data Rate (DR) | Data rate for a ProS |
| Power control interval (PCInt) | Period for updating CPCI and adjusting transmitting power level |
| Modulation and Coding Scheme (MCS) | Modulation and coding used for a proximity service |
| Latency (Lat) | Delay tolerance for a proximity service |
| Location (Loc) | Location of a peer for a proximity service |
| Speed (Sd) | Speed for a proximity service |

ProS-based power control information may be defined as control or status data for power control, which can be used for reporting or controlling the transmitting power of a peer's transceiver. For example, power control information may include information, such as transmit power (TxP), maximum transmit power (MaxTxP), minimum transmit power (MinTxP), power adjustment (PAdj), endpoint (EP), path loss (PL), received signal quality (RxSQ), or the like, which are briefly shown in Table 2 and discussed in more detail below.

TABLE 2

| Proximity Service Based Power Control Information | Description |
| --- | --- |
| Transmit Power (TxP) | TxP is the power level of a transmission during a PCInt from a transmitter in a ProS P2PNW. |
| Maximum Transmit Power (MaxTxP) | MaxTxP is maximum power level allowed for transmission for a ProS P2PNW. |
| Minimum Transmit Power (MinTxP) | Minimum power level required for transmission for a ProS P2PNW |
| Power Adjustment (PAdj) | Power adjustment for initial or open loop context-related power control |
| Endpoint (EP) | The endpoint or receiver of a transmission within a ProS P2PNW. |
| Path Loss (PL) | The attenuation or propagation loss through the wireless channel |

TABLE 2-continued

| Proximity Service Based Power Control Information | Description |
|---|---|
| Received Signal Quality (RxSQ) | The received signal quality may be indicated by the measured Received Signal Strength Indicator (RSSI), received Signal Interference Noise Ratio (SINR), or Channel Quality Indicator (CQI), etc. |

FIG. 1 provides several examples of how CPCI may be transmitted among peers. Here, it is assumed that the communication is processed from right to left, as shown by arrow 251. As shown in FIG. 1, based on the implementation and proximity service involved, there may be different CPCI transmitted and relied upon for context-related power control management. For example, a first ProS may operate sufficiently with default values and only transmit updates to BW at a first time period, while transmitting updates to EP and PCInt at a second time period. Communication 241 is an example of CPCI 245 transmitted within a beacon. A peer in proximity may detect the CPCI 245 inserted in communication 241. Communication 242 is an example of CPCI 246 broadcast on a common channel, such as a common control channel or common data channel. Communication 242 may also be broadcast on a broadcasting channel, paging channel, or the like. A peer in proximity may detect CPCI 246 inserted in communication 242. Communication 243 is an example of CPCI 247 transmitted in a transmission frame positioned after control data 248. The type of CPCI 247 within communication 243 may be indicative of a peer device engaged with multiple end-points or receivers in same or different ProS P2PNWs. In a scenario of the same Pros P2PNW, this is an example of exchanging CPCIs for group based communications, i.e. the transmitter piggy backs the transmitting power to each end-point (receiver) in the control or data message. Communication 244 is an example of CPCI transmitted in a transmission frame positioned before control data 250. CPCI 249 includes TxP, RxSQ, and PAdj, which may be indicative of control information for power control response, or information for closed loop power control with required power adjustment from a receiver. The exact location of CPCI, and the manner in which it is transmitted among peers, may vary across different implementation of CPCI for context-related power control, and the present disclosure is by no means limited to any one of the types of communications in which CPCI is shown as being transmitted in FIG. 1.

Figure 2:
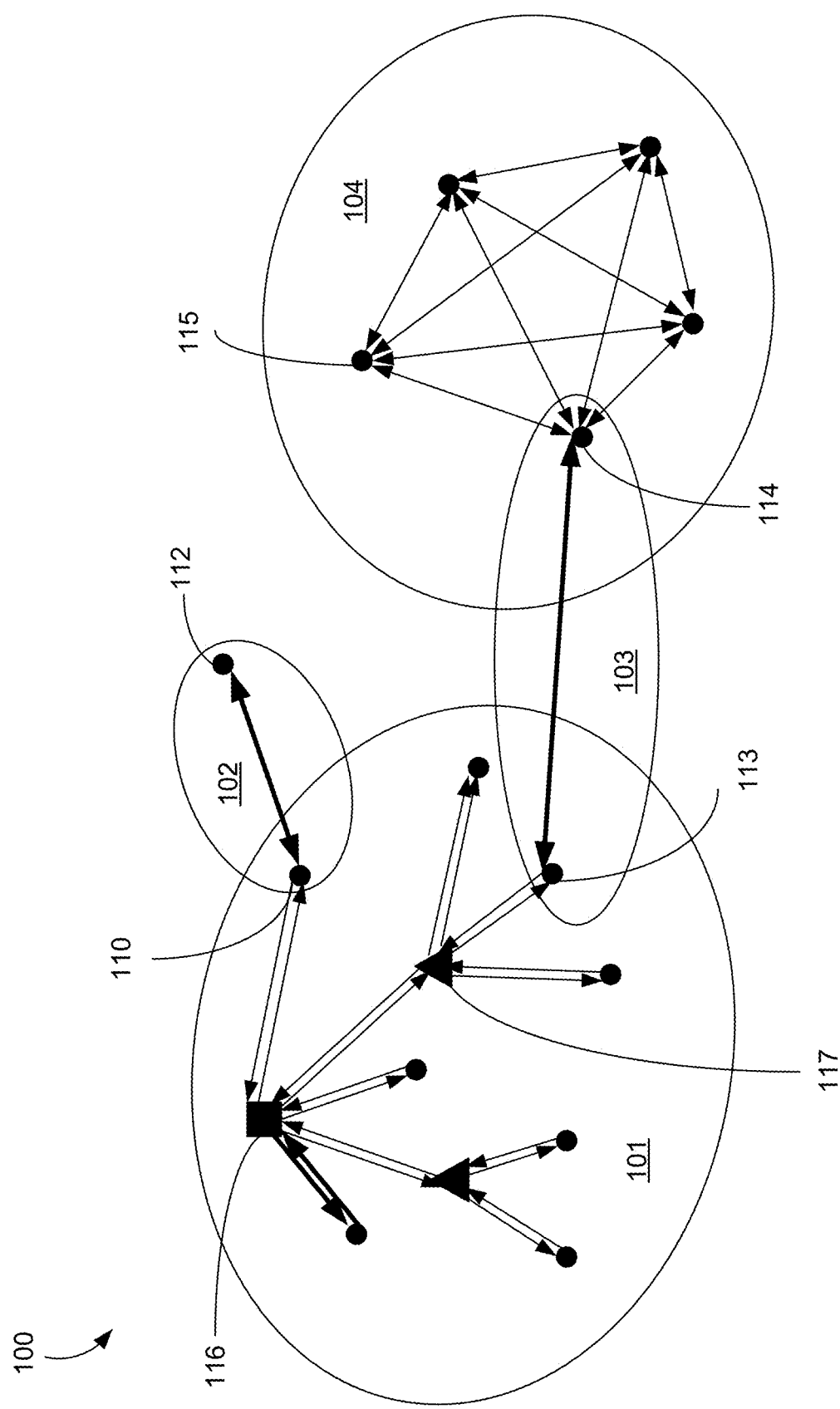
FIG. 2 illustrates an exemplary scenario for context-related power control management.

An example of a CPCI use case is illustrated in FIG. 2 with further corresponding details in Table 3. FIG. 2 illustrates an exemplary scenario for context-related power control management. P2PNW 101 (i.e., ellipse 101) contains a plurality of peers that are communicating using centralized group communication.

A peer may be a tablet, smart phone, music player, game console, personal digital assistant, laptop, PC, medical device, connected car, smart meter, home gateway, monitor, alarm, sensor, set-top box, printer, a mobile station (MS) in a 2G network, a user equipment (UE) in a 3G network, or one or a group of full-function devices (FFDs) or reduced-function devices (RFDs) in IEEE 802.15 (wireless personal area network (WPAN)) networks. As one example, a peer may have the hardware architecture illustrated in FIG. 12C (described more fully below) or a variation thereof, or it may have the architecture of the computing system illustrated in FIG. 12D (also described more fully below).

Referring still to FIG. 2, the peers in P2PNW 101, such as peer 110, peer 113, peer 116, and peer 117, are in communication with each other via several dispersed CPCI management aggregation points hereinafter called virtual leaders. A virtual leader (e.g., peer 116) is a peer that may be dynamically selected to represent, manage, and coordinate the P2P communications among a group of peers sharing the same ProS, i.e. within a P2PNW, for centralized intra-P2PNW control. A super virtual leader (not shown) is a virtual leader defined to coordinate all virtual leaders of P2PNWs in proximity for centralized inter-P2PNWs control. A virtual leader and super virtual leader may be used for the purposes of synchronization, power control, interference management, channel allocation, access control, or the like.

Each P2PNW in FIG. 2 may have different ProSs implemented. For example, the peers within P2PNW 101 may communicate with each other by the use of a video conference ProSs. As another example, the peers within P2PNW 102 may communicate with each other by the use of a chat ProSs and may be involved in a pair communication. The peers within P2PNW 103 may communicate with each other by the use of a keep alive ProSs and may be involved in a pair communication. The peers within P2PNW 104 may communicate with each other by the use of a gaming ProS and may be involved in a distributed group communication. In a distributed group communication, each peer of a P2PNW manages all control related communications with other peers of P2PNWs in proximity, which may communicate over a common channel, broadcasting channel, paging channel, or the like.

Thus, in the example of FIG. 2, the ProSs of P2PNW 101, P2PNW 102, P2PNW 103, and P2PNW 104 have peers with different contexts. As illustrated in Table 3, the ProSs shown in FIG. 2 may have different recommended context information and power control information settings. As described in more detail below, understanding the context of different ProSs may allow for the optimization of transmit power to support a preferred quality of service level of a ProS, while minimizing wireless radio interference and power consumption, among other things.

TABLE 3

| Application | Context Info | Power Control Info |
|---|---|---|
| Video Conf. Meeting | 1. Service Power Category: e.g. Spcat1 - very high data rate & low error rate<br>2. QoS: 1-to-N group based - guaranteed or best effort to all peers<br>3. Service Range: medium | 1. Max. Tx Power: medium<br>2. Power Control Interval: long<br>3. Measurements at Rx: SINR, CQI, etc.<br>4. Info from Tx: Tx power level, location, etc. |
| Gaming | 1. Service Power Category: e.g. SPcat2 - high data rate & low error rate<br>2. QoS: distributive group based - guaranteed to all peers<br>3. Service Range: small | 1. Max. Tx Power: medium<br>2. Power Control Interval: long<br>3. Measurements at Rx: SINR, CQI, etc.<br>4. Info from Tx: Tx power level, location, etc. |
| Chat | 1. Service Power Category: e.g. SPcat3 - low data rate & high error rate<br>2. QoS: average | 1. Power Control Interval: medium<br>2. Measurements at Rx: SINR, RSSI, etc.<br>3. Info from Tx: Tx power level, speed, etc. |
| Keep Alive | 1. Service Power Category: e.g. SPcat4 - very low data rate & high error rate<br>2. QoS: low | 1. Measurements at Rx: RSSI, etc.<br>2. Info from Tx: Tx power level, speed, etc. |

Figure 3:
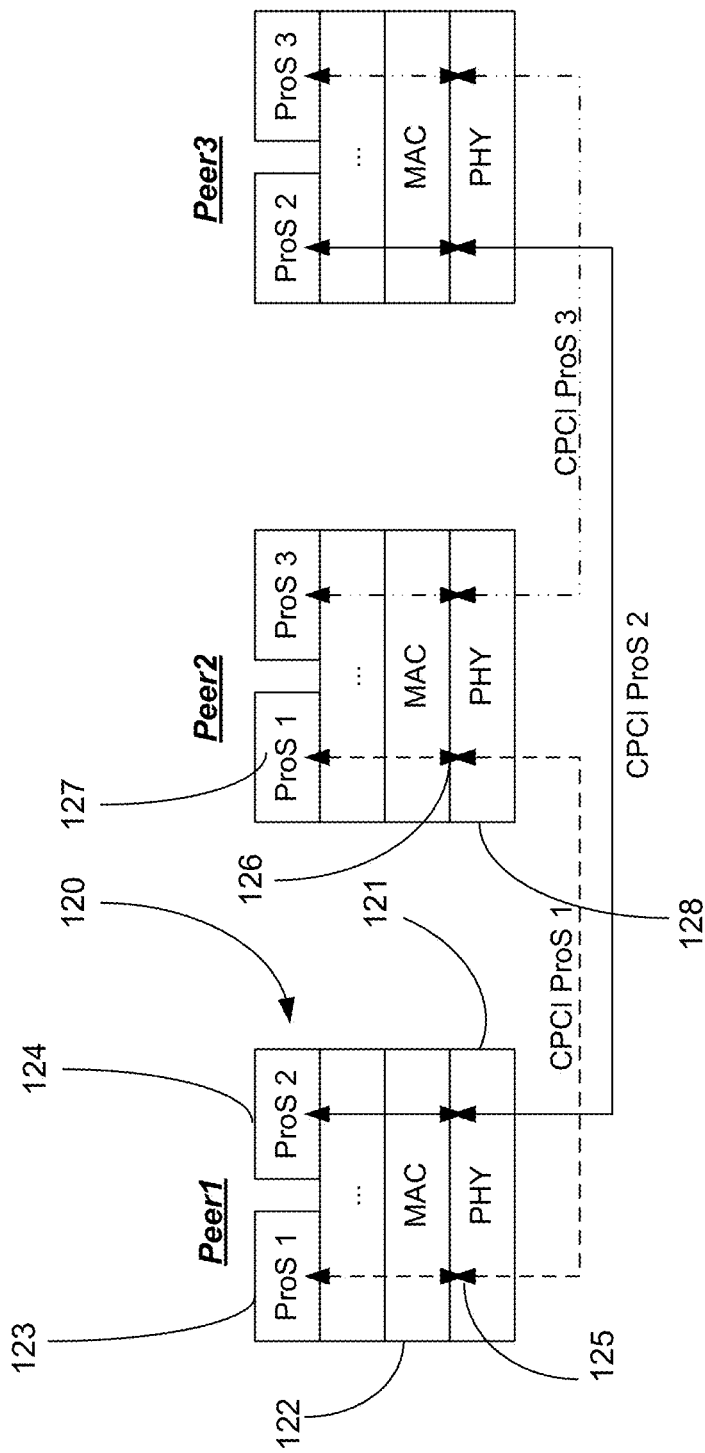
FIG. 3 illustrates cross-layer context power control information (CPCI) in proximity.

As illustrated in FIG. 3, CPCI may be managed across multiple layers that may include service layer 120, MAC layer 122, and physical layer 121. There may be an application layer above service layer 120. In an embodiment, CPCI may be maintained at service layer 120 or an application layer (not shown) for default CPCI and at physical layer 121 or MAC layer 122. ProS may be located at service layer 120 or application layer (not shown) above service layer 120. In FIG. 3, ProS 123 may update CPCI during a session of transmitting and receiving, based on detected information or measured results at a power control function 125 located at physical layer 121. The power control function of a device is a hardware and/or software module executing on a processor of the device that controls the transmission power of the device's transmitter. The updated CPCI values at power control function 125 may be fed back to higher layers, such as ProS 123 of service layer 120. Also shown in FIG. 3, CPCI may also be exchanged at low layers between or among peers for context-related power control to ensure reliable proximity services. Power control function 125 associated with ProS 123 may communicate with power control function 126 of physical layer 128. The power control function may be implemented at physical layer 121 or MAC layer 122 in order to minimize latency and meet any latency requirements. Some or all of the power control function may be at the service layer 120 or application layer, e.g. defining the default parameter values based on the ProS and overriding lower layer (e.g., MAC or PHY) power control values, among other things.

Disclosed hereinafter are schemes for managing CPCIs across layers and exchanging CPCIs between or among peers in proximity. Context-related power control may enable more reliable and efficient IoT proximity services. Context-related power control mechanisms, generally described, may include general context-related power control, context-related multi-application power control, and context-related Intra-P2PNW point-to-multipoint power control. General context-related power control, context-related multi-application power control, and context-related Intra-P2PNW point-to-multipoint power control may involve CPCI detection, inter-P2PNWs power control, intra-P2PNWs power control, and CPCI management.

Figure 4:
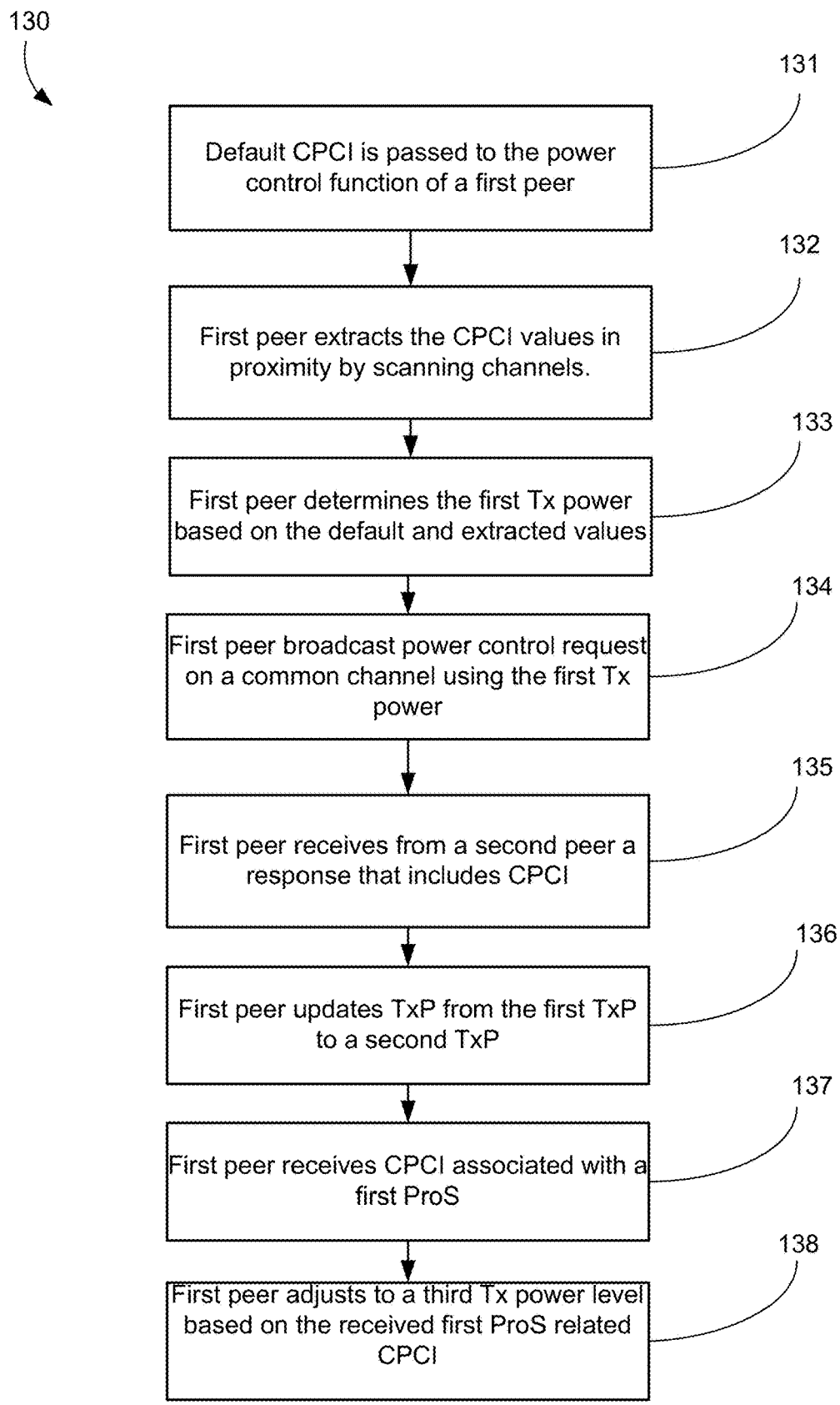
FIG. 4 illustrates an exemplary method for general context-related power control.

FIG. 4 illustrates an exemplary method for general context-related power control, in accordance with one embodiment. At step 131, default CPCI passes to the power control function of a peer. The power control function may receive from a service layer (or other layer, such as the application layer) on the first peer a default CPCI that was preconfigured (e.g., manually configured by the user or automatically configured by the application or service layer at initial activation of the first peer or ProS) or updated from a previous session (e.g., automatically updated during a previously connected ProS session). At step 132, the first peer receives CPCI from peers in proximity by scanning channels, such as beacon, paging, or broadcast channels. In situations where there is no CPCI detected in proximity, a default minimum TxP or TxP based on historical records (e.g., previous averages or mean TxPs) or default values based on the power control category (PCat) may be used. At step 133, the first peer determines a first TxP. Here, the first peer may determine the first TxP level based on default CPCI values (e.g., step 131), which may be passed from a higher layer, as well as CPCI values received from peers in proximity (e.g., step 132).

With continued reference to FIG. 4, at step 134, the first peer broadcasts power control request or piggy backed with control or data transmission at a common channel at the first TxP. At step 135, the first peer receives from a second peer in proximity a response that may include the CPCI of the second peer (e.g., CPCI may have the power adjustment (PAdj) and other CPCI for first peer). The second peer may send more than one CPCI, which may be related to each proximity service on the second peer or group of peers being managed by the second peer if the second peer is a virtual lead. At this step, the second peer (this is also applicable to a plurality of peers) need only be in proximity and not necessarily using the same ProS as the first peer for inter-P2PNWs power control. At step 136, based on the updated CPCI, the first peer recalculates TxP using the power control function and adjusts its TxP accordingly, which results in a second TxP of the first peer. At step 137, after the use of the inter-P2PNW associated TxP (i.e., second TxP) of step 136, the first peer may receive CPCI associated with a first ProS in use on the first peer for intra-P2PNW power control. At step 138, based on the received first ProS related CPCI of step 137, the second TxP may be adjusted to a third TxP. When multiple peers are involved, the first peer may consider received CPCI from each peer and adjust the TxP that is appropriate for the ProS(s). For example, if there are a plurality of peers, the first peer may average or use the maximum or minimum of the optimal TxPs it calculates for each peer.

Still referring to FIG. 4, step 132 may be considered a CPCI detection step. Step 133 through step 136 may be considered inter-P2PNW power control steps. And step 137 and step 138 may be considered intra-P2PNW power control steps. CPCI detection, inter-P2PNW power control, and intra-P2PNW power control information call flows are discussed in more detail below.

Figure 5:
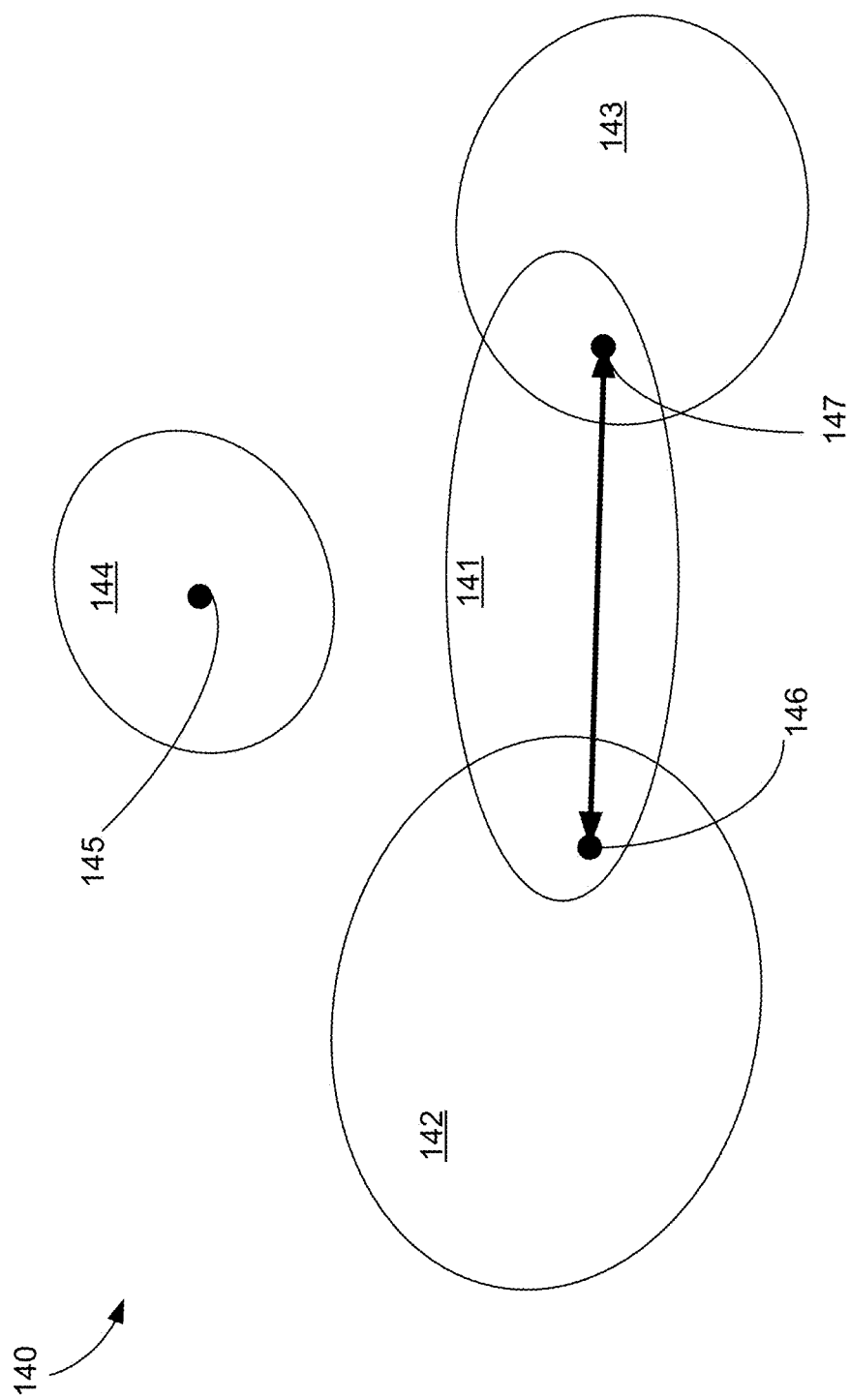
FIG. 5 illustrates a system of peers proximal to each other.

FIG. 5 illustrates a system 140 including peers proximal to each other, similar to FIG. 2, where CPCI may be used for context-related power control. FIG. 5 uses ovals to illustrate the P2PNW for each ProS utilized by a peer. The ovals should not be interpreted as a radio range or the like of a peer. Peer 146 utilizes a P2PNW for ProS 141 and a P2PNW for ProS 142, peer 147 utilizes a P2PNW for ProS 141 and a P2PNW for ProS 143, and peer 145 utilizes a P2PNW for ProS 144. As illustrated, peer 146 and peer 147 both utilize the P2PNW for ProS 141. Peer 145 may communicate with one or more other peers (not shown) within the P2PNW for ProS 144. Peer 146 and peer 147 may also communicate with one or more other peers (not shown) within the P2PNW for ProS 142 and P2PNW for ProS 143, respectively.

Figure 6:
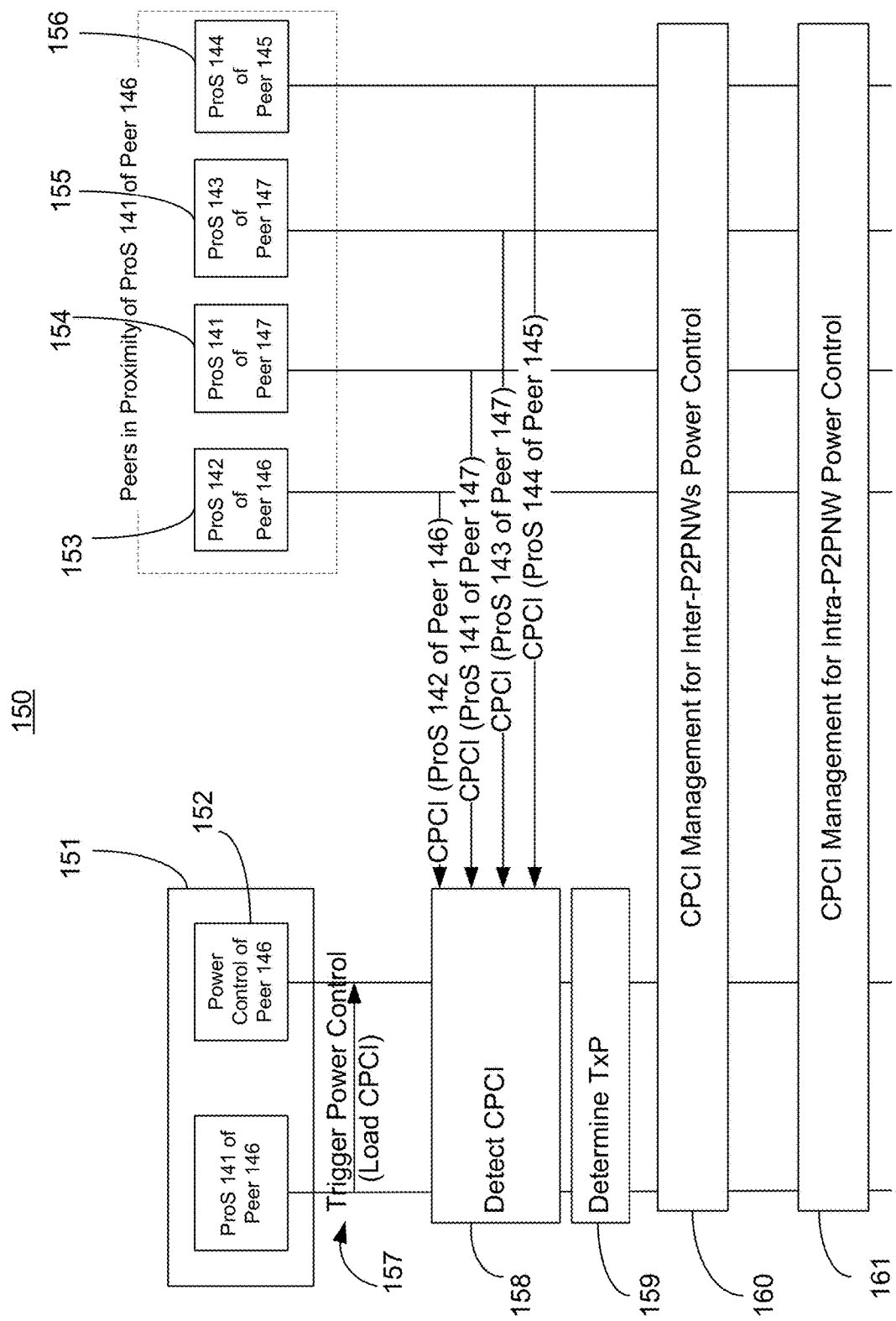
FIG. 6 illustrates an exemplary call flow that illustrates the use of CPCI detection, in accordance with one embodiment.

FIG. 6 illustrates an exemplary call flow 150 that considers the use of CPCI detection in the system 140 of FIG. 5. As shown in FIG. 6, peer 146 includes ProS 141 and power control function 152. At step 157, ProS 141 on peer 146 (block 151) sends CPCI to power control function 152 associated with ProS 141 on peer 146. CPCI of step 157 may be default CPCI values preconfigured or updated from previous sessions. It is possible for other layers to store and send the default CPCI values. At step 158, peer 146 detects CPCI from various sources, such as block 153 (ProS 142 on peer 146), block 154 (ProS 141 on peer 147), block 155 (ProS 143 on peer 147), and block 156 (ProS 144 on peer 145). Peer 146 may detect CPCI by scanning beacon, paging, broadcast channels, or the like. The received CPCI of step 158 may include information associating the CPCI to a particular ProS and peer.

At step 159, peer 146 may determine its initial TxP based on default CPCI values (step 157), detected CPCI values (step 158), as well as measured CPCI values (e.g., measured RxSQ—not shown). TxP may be based on an averaging of received TxP of the received CPCI or using the MinTxP default CPCI value, if no CPCI is received from another peer or ProS. The use of step 157 and step 158 may be based on ProS 141 of peer 146 becoming re-enabled after an idle period (e.g., not using ProS 141) for a predetermined extended period of time. In addition, a process for CPCI management for inter-P2PNW power control (shown at 160) and a process for CPCI management for intra-P2PNW power control (shown at 161) may be performed after the completion of step 157 through step 159. It should be noted that the peers in FIG. 6 and the other figures may be VLs or super VLs.

Figure 7:
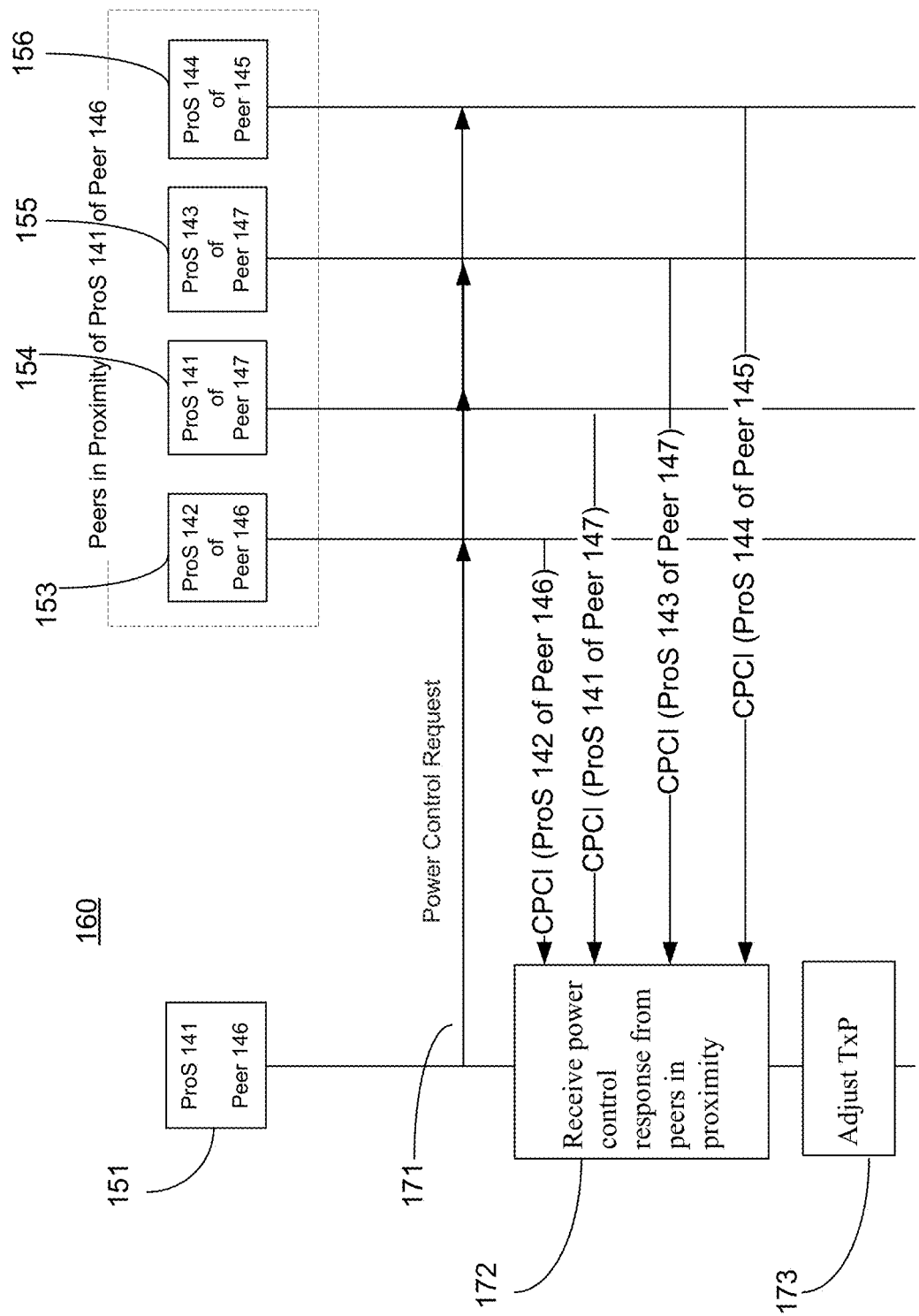
FIG. 7 illustrates an exemplary call flow for inter-P2PNW management, in accordance with one embodiment.

FIG. 7 is an exemplary call flow providing further details of the process 160 for CPCI management for inter-P2PNW power control in the context of system 140, in accordance with one embodiment. During inter-P2PNW CPCI management, a peer may collaborate with peers in proximity by exchanging CPCI on a common channel. At step 171, peer 146 broadcasts (on a common channel) a power control request message (PCReq) associated with ProS 141. The PCReq may include the CPCI related to Pros 141 of peer 146. The PCReq may be sent to peers in proximity, but not necessarily participating in the same P2PNW for ProS 141.

At step 172, peer 146 receives responses (e.g., power control responses) that includes CPCI from various peers in proximity, such as block 153 (ProS 142 on peer 146), block 154 (ProS 141 on peer 147), block 155 (ProS 143 on peer 147), and block 156 (ProS 144 on peer 145). At step 173, peer 146 adjusts the TxP based on the received responses of step 172. The CPCIs may be exchanged and updated at a lower layer (e.g., PHY or MAC) and then sent to a higher layer (e.g., service or application layer above TCP/IP in OSI model for infrastructure based communication systems or above MAC layer without TCP/IP layers for infrastructure-less wireless system).

Figure 8:
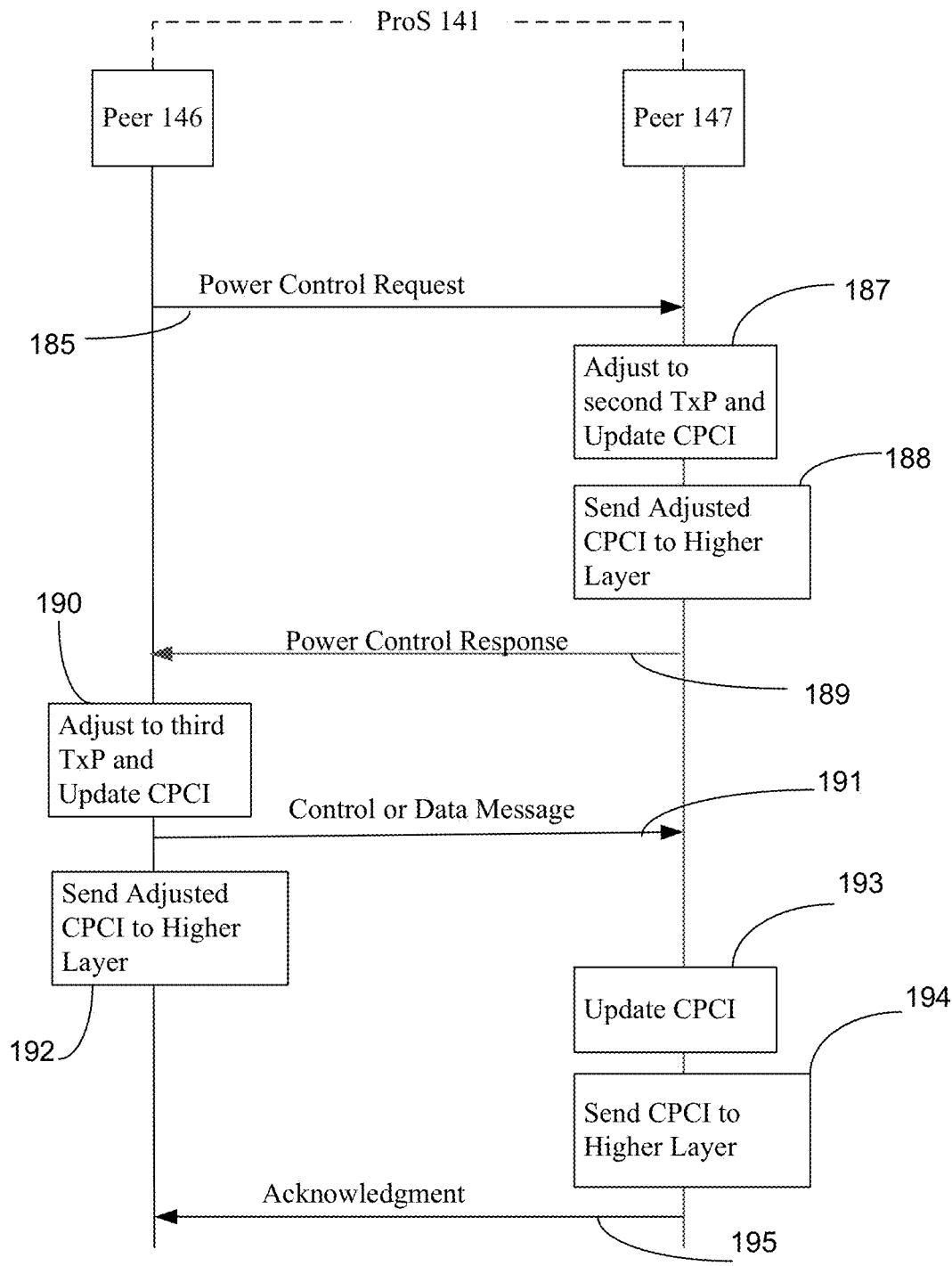
FIG. 8 illustrates an exemplary call flow for intra-P2PNW management, in accordance with one embodiment.

FIG. 8 is an exemplary call flow providing further details of the process 161 for CPCI management for intra-P2PNW power control in the context of system 140, in accordance with one embodiment. Here, CPCI associated with ProS 141 is exchanged between peer 146 and 147, which operate within the same P2PNW for ProS 141. At step 185, peer 146 sends to peer 147, at a predetermined first TxP, a power control request (PCReq) with CPCI related to ProS 141 on peer 146. The first TxP may be based on a default CPCI value, a "CPCI detection" derived CPCI, an intra-P2PNW management derived TxP, or the like. At step 187, peer 147 adjusts to a second TxP and updates its CPCI based on the CPCI received at step 185. At step 188, the updated CPCI of step 187 may be sent to a higher layer (e.g., application layer associated with ProS 141) of peer 147. At step 189, peer 147 sends a power control response (PCRes), at the second TxP. The PCRes of step 189 may include the updated CPCI of step 187.

At step 190, peer 146, adjusts to a third TxP and updates its CPCI based on the CPCI received at step 189. At step 191, peer 146 sends a control or data message at the third TxP. The message of 191, may include the updated CPCI of step 190. At step 192, the updated CPCI of step 190 may be sent to a higher layer (e.g., application layer associated with ProS 141) of peer 146. At step 193, peer 147 updates its CPCI based on the received CPCI of step 191 and at step 194 the updated CPCI is sent to a higher layer. At step 195, peer 147 sends to peer 146 an acknowledgement that peer 147 received the message of step 191. Periodically, CPCI may be transmitted and TxP adjusted based on a predetermined time, such as PCInt. In an embodiment, if peer 146 sends a PCReq and a timely response (e.g., PCRes) is not received, then the TxP power may be incrementally adjusted and a PCReq may be resent until a PCRes is received, a predetermined number of timeouts is reached, or the like.

As discussed herein, a peer can join one or more P2PNWs simultaneously in proximity. For example, with reference to FIG. 5, peer 146 may interact with peer 147 via chat using ProS 141 and may check an advertisement or coupon broadcast from a store by another peer (not shown) associated with ProS 142. In this example, CPCI may need to be managed across applications on a device. When providing context-related power control across multiple applications on single peer, CPCI detection and inter-P2PNW power control management is similar to what is discussed in FIG. 6 and FIG. 7, respectively. Intra-P2PNW power control would be similar to what is discussed with regard to FIG. 8, but with an added layer of complexity. For example, peer 146 adjusts TxP of each transmission to fit the determined TxP for the particular ProS used in the transmission (e.g., a different TxP for chat ProS and an advertisement ProS). More details are discussed below.

Figure 9:
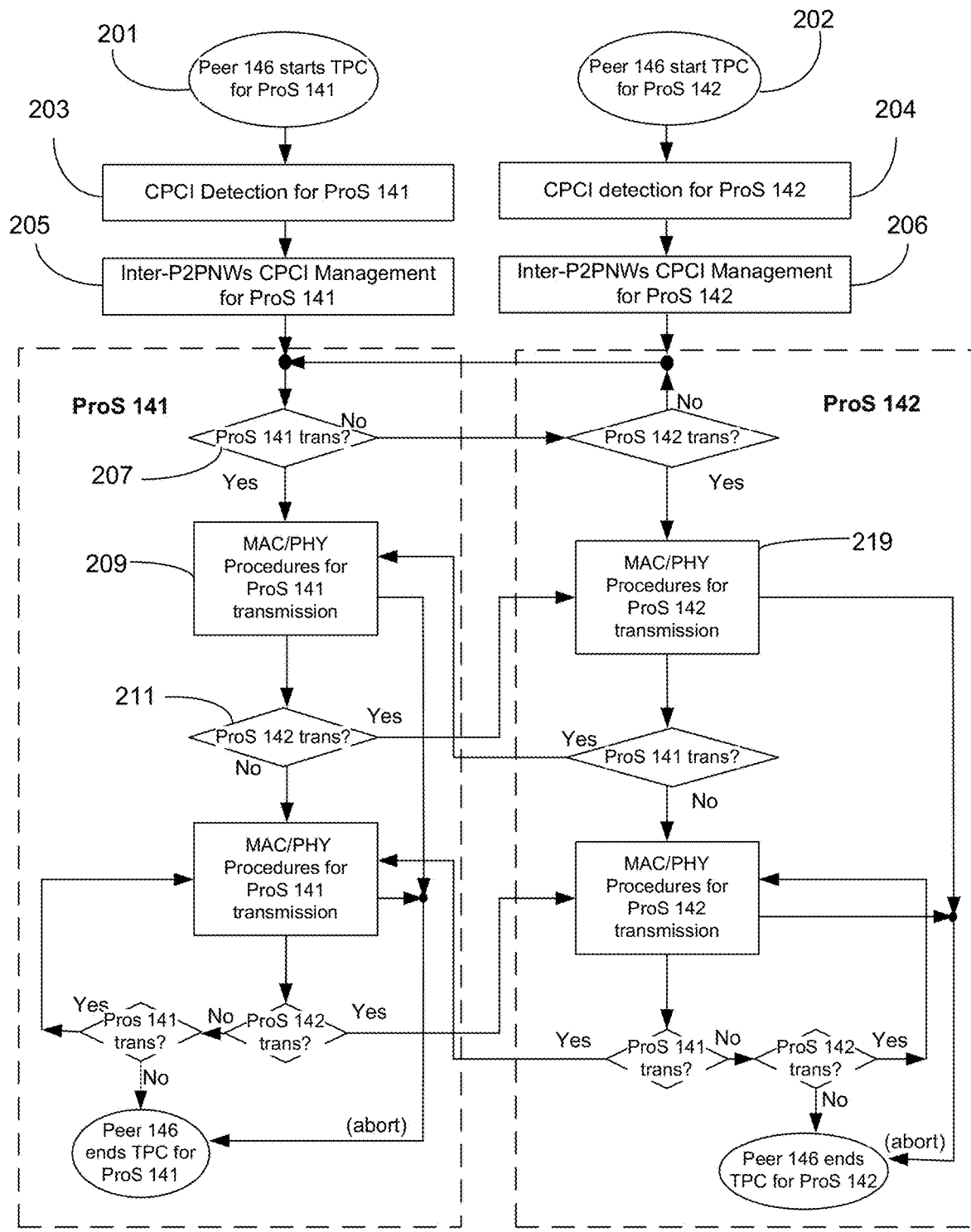
FIG. 9 illustrates an exemplary method for CPCI management for intra-P2PNW multi-application power control, in accordance with one embodiment.

FIG. 9 illustrates an exemplary method for CPCI management for intra-P2PNW multi-application power control from the perspective of peer 146 of system 146. At step 201 and step 202, peer 146 starts context-related power control for ProS 141 and ProS 142, respectively. Step 202 and Step 203 may be triggered by an indication that transmission needs to occur for a ProS. The indication may be a user command or automated occurrence based on a condition, such as time or receiving data from a peer or other device. The indication may follow an initial startup of the PRoS after a timeout based on idle time, device reboot, or the like. At step 203 and step 204, CPCI detection may be utilized for ProS 141 and ProS 142 respectively. At step 205 and step 206, inter-P2PNW management may be utilized for ProS 141 and ProS 142, respectively. At step 207, peer 246 determines whether ProS 141 needs to transmit. If yes, at step 209, in this implementation, context-related power control procedures in the MAC/PHY layer for ProS 141 are applied and a transmission occurs. After the transmission, at step 211, peer 146 determines whether ProS 142 needs to transmit. If yes, at step 219, in this implementation, context-related power control procedures in the MAC/PHY layer for ProS 142 are applied and a transmission occurs. If no, peer 146 continues to send transmissions based on context-related power control procedures in the MAC/PHY layer for ProS 141. As shown in FIG. 9, similar transmission analysis, with regard to context-related power control procedures in the MAC/PHY layer for ProS 141 and ProS 142, would continue on peer 146 until context-related power control is aborted.

Many ProSs are group communication based via broadcasting or multicasting, such as a ProS conference meeting with a presenting speaker or a gateway that manages parking meters for smart parking. Point-to-multipoint intra-P2PNW CPCI management is similar to CPCI management for intra-P2PNW multi-application power control, as discussed above, except that a central peer may multicast CPCI to multiple peers rather than unicast CPCI to each peer. A more detailed example is below.

Figure 10:
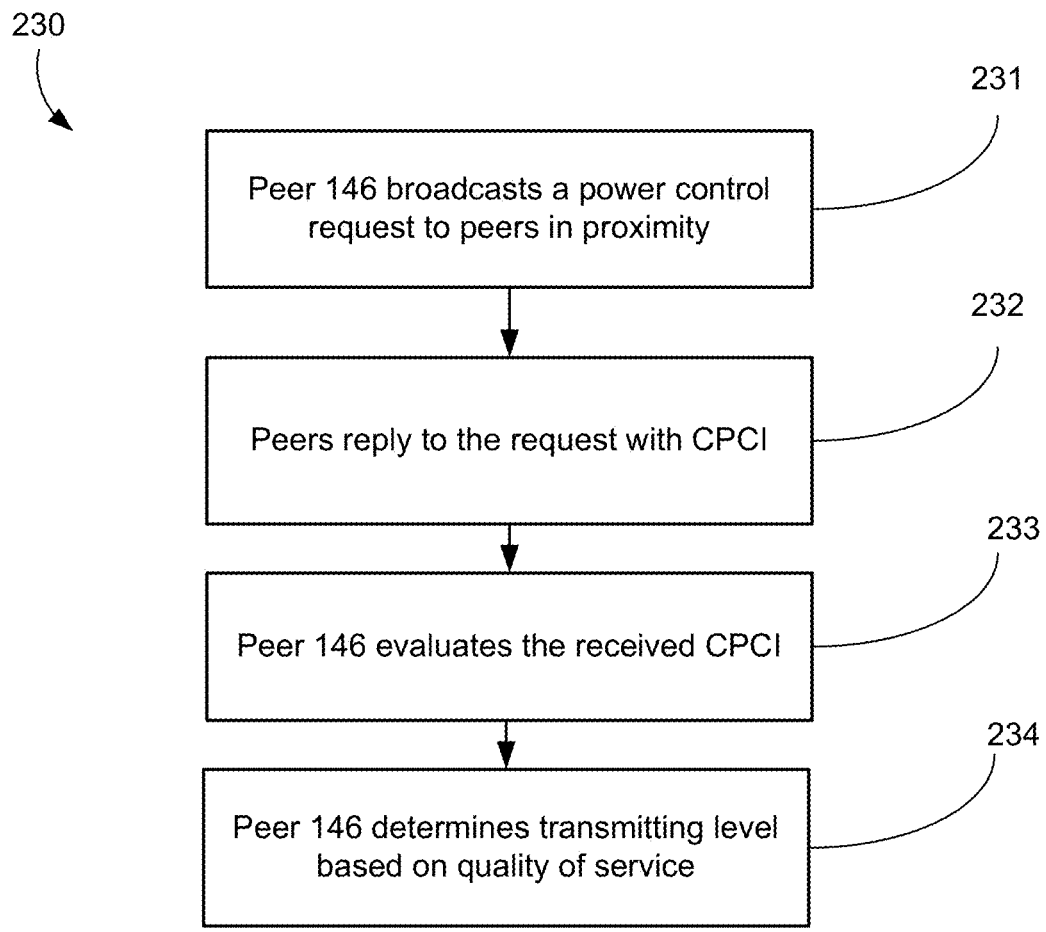
FIG. 10 illustrates an exemplary method for point-to-multipoint context-related power control, in accordance with one embodiment.

FIG. 10 illustrates an exemplary method 230 for one-to-many communication for context-related power control with reference to system 140 of FIG. 5. At step 231, peer 146 broadcasts or multicasts a power control request to the peers in proximity that have ProS 141. The power control request includes transmitting power level (e.g., in dBm) and location (e.g., absolute or relative geo-location). At step 232, peer 147 (the closest receiver) replies with its power control response that includes transmitting power level (i.e. in dBm) and location ((i.e. absolute or relative geo-location). In this example, there are also peers (not shown) that are a farther distance away from peer 146 than peer 147. All peers respond to peer 146. At step 233, peer 146 evaluates the received CPCI and determines the power adjustment for peer 147 and each other peer based on the calculated path loss from the received CPCI. At step 234, peer 146 determines the transmitting level based on the power control category or the QoS of the service or application. In this example, there may turn out to be three quality of service levels used. There may be a guaranteed quality of service defined as transmitting power=previous power+¼ dB for communications with a peer that is the farthest distance away from peer 146. There may be best effort quality of service defined as transmitting power=previous power−¼ dB for communications with peer 147 (the near receiver). Lastly, there may be an averaged quality of service defined as transmitting power=previous power+averaged power adjustment for communications among all other peers.

Table 1 and Table 2 above briefly discussed context information and power control information. More details with regard to context information and power control information are provided below. As disclosed above, context information may include information, such as a service power category (SPcat), service range (SerR), power control interval (PCInt), bandwidth (BW), data rate (DR), modulation and coding scheme (MCS), latency (Lat), location (Loc), speed (Sd), or the like.

SPcat is a predetermined value that is indicative of a category for power control requirements for different types of ProSs, such as public safety, healthcare, social networking, commercial advertisement, sensor network, or smart office, among others. The categories may be defined using numeric, alphabetic, or alphanumeric values. For example, a first category (e.g., SPcat=1) may be created for ProSs that may require a high data rate and high quality of service, among other restrictions or preferences, and a second category (e.g., SPcat=2) may require a low data rate and a low quality of service. For example, healthcare ProSs may be defined as SPcat=1, while a sensor network and chat application may each be defined as SPcat=2. SPcat may be used to set a default power control scheme. For example, when a ProS is first initialized the default TxP and other power control parameters may be set. This default scheme may be adjusted as context information and power control information is received and analyzed on a peer.

SerR is context information that may be defined as the typical service radio range (i.e., distance) that is recommended for a predetermined adequate quality of service for a ProS P2PNW. The service range can vary based on different ProSs. For example, the SerR between peers for a public safety ProS may be 2 kilometers, while the SerR between peers of a smart home proximity service may be 120 meters.

PCInt is context information that may be defined as the period for updating or exchanging CPCI, as well as for adjusting the transmit power level. For example, PCInt may be a relatively large value for a ProS P2PNW with very low or no mobility in order to save the overhead of CPCI exchanges between the transmitter and receiver, while PCInt may be a relatively small value for a ProS P2PNW with high mobility. Speed may be a factor in determining PCInt. PCInt may be considered power control information or context information since is the period used for updating CPCI or adjusting transmit power level.

BW, DR, and MCS are usually associated with each other. BW is context information that may be defined as the bandwidth (e.g., Mbit/s) or subcarriers (e.g., resource blocks) allocated for a peer in a ProS P2PNW. BW may be the typical BW to ensure a predetermined adequate quality of service or the BW available to a peer. Generally, a bandwidth is allocated commensurate with data rate ProSs and signal strength to ensure a required or recommended throughput. DR may be defined as the typical data rate to ensure a predetermined adequate quality of service for a ProS and may be defined as a measured data rate of a peer. MCS may be defined as the modulation and coding scheme used for a ProS, such as different methods for quadrature amplitude modulation (QAM), phase-shift keying (PSK), amplitude-shift keying (ASK), or the like. Higher modulation and coding schemes may involve high data rate ProSs, which may require higher maximum transmitting power to ensure the required throughput.

Lat may be defined as the delay tolerance for a ProS. For example, emergency related ProSs may require very low Lat (e.g., milliseconds), while keep alive related proximity services may be able to tolerate high Lat (e.g., seconds or minutes). Latency requirement may affect power control interval (PCInt). For low latency services or applications, the PCInt value may be relatively small compared with high latency services or applications.

Loc may be defined as the location of a peer for a proximity service, such as geolocation, displacement from another site (e.g., 50 feet northwest from a P2PNW), or the like. Loc may be an absolute location (e.g., latitude and longitude) or relative to a peer. Loc may be used to estimate the path loss. For a fully distributed and infrastructureless wireless system, there is no central controller, such as the NB or eNB in 3GPP cellular system, for managing the transmitting power control. Therefore, a peer may estimate the transmitting power level based on the path loss derived from the other transmitter's location and transmitting power level, as well as the received signal strength.

Sd may be defined as the typical speed of a peer to ensure a predetermined adequate quality of service for a ProS P2PNW. Sd also may be defined as a measured speed of a peer. For example, a car on a highway may travel at a high speed and may cause more channel variance, which may require relatively frequent power adjustment, i.e. lower value of PCInt, when compared to a pedestrian speed. For some ProS, higher speed may also cause performance degradation, which may requires higher transmitting power to ensure the throughput performance. A measured speed may be used to define PCInt.

Power control information, as discussed herein, may include information, such as transmit power (TxP), maximum transmit power (MaxTxP), minimum transmit power (MinTxP), power adjustment (PAdj), endpoint (EP), path loss (PL), received signal quality (RxSQ), or the like.

TxP may be the typical power level (e.g., dbm) that may ensure a predetermined adequate quality of service for a ProS P2PNW or also may be defined as a measured TxP at a particular time. This value may be adjusted during the closed loop power control. MaxTxP is a maximum power level allowed for transmission for a ProS P2PNW that may ensure a predetermined adequate quality of service for a ProS P2PNW or the MaxTxP available to a transmitter. If a transmitter reaches its MaxTxP value, it cannot increase the transmitting power level any more, even if the calculated power adjustment is "increasing power" during either open or closed loop power control. MinTxP is a minimum power level required for transmission for a ProS P2PNW that may ensure a predetermined adequate quality of service for a ProS P2PNW or the MinTxP available to a transmitter.

Usually a transmitter starts transmitting with its MinTxP, if there is not enough other information for estimating the initial power level.

PAdj is power adjustment for initial, closed, or open loop context-related power control. PAdj may be a relative value from the current power level (e.g., decrease by 0.5 db) or instruction to transmit within a range (e.g., less than 10 dbm).

EP is the end-point (i.e., receivers) in a group based communication either one-to-many broad/multi-cast or one-to-one unicast within the group. The EP value may be the EP's identifier (e.g., peer or device identifier) which is locally unique within the P2PNW. EP could be mapped from MSISDN to a locally unique shorter ID, or other peer or device identifier Other power control information may be PL and RxSQ. PL is the attenuation or propagation loss through the wireless channel. PL is used for estimating the initial power level or calculating the next power adjustment. PL may be a relative value, such as 10 db. RxSQ may be used for estimating the initial power level or calculating the next power adjustment. RxSQ may be indicated by the measured received signal strength indicator (RSSI), received signal interference noise ratio (SINR), or channel quality indicator (CQI), or the like.

CPCI, as discussed herein, may be a category designation that signifies a range rather than an absolute value. For example, Sd may be a category, such as "pedestrian speed," which may indicative of a speed between 1 and 5 kilometers per hour. Alternatively, Sd, for example, may be an absolute value such as 4.75 kilometers per hour. The category and absolute value concepts may apply to Loc, MCS, Lat, DR, BW, PCInt, and SerR, among other context information or power control information. CPCI may be updated based on historical data.

As discussed above in connection with FIG. 1, CPCI may be transmitted among peers in a variety of ways. In addition to the options illustrated in FIG. 1, in other embodiments, modified or extended IEEE 802.15 or 802.11 MAC frames may be employed to facilitate transmission of CPCI, as well as new Information Elements (IE)s. In one embodiment, a new frame format may be used that may be a general MAC frame with new fields in the MAC header that are related to context information that facilitates the power control procedures described herein. New management frames may also be used to support power control requests and responses. Further detail about these frames and IEs is provided below.

FIG. 11A illustrates one embodiment of a modified MAC frame format 400 that may be used in connection with the power control procedures described herein. In FIGS. 11A and 11B, fields indicated in bold, italic, and underline are new or modified fields and may include new sub-fields. Other fields may have the same meaning as defined in the existing IEEE 802.15.4 and 802.11 standards.

As shown, the frame 400 generally comprises a MAC header 402 and MAC payload 404. In one embodiment, all fields in the frame may be required except the auxiliary fields 416 and auxiliary security header 418. In an embodiment, the sequence number field 408 and auxiliary security header 418 may have the same meaning as defined in the IEEE 802.15.4 standard.

In this embodiment, the frame control field 406 carries control information, such as the frame type, required type of acknowledgement message, and addressing mode. FIG. 11B illustrates one embodiment of a format 500 of the frame control field. In an embodiment, the frame type, frame pending, frame version, security enabled, and IE present fields may have the same meaning as defined in the IEEE 802.15.4 standard. In one embodiment, all the fields in this frame control fields 406 may be mandatory.

Frame type and subtype fields 424, 426 may be mandatory and together may indicate the type of a frame, i.e., the function of a frame. In one embodiment, there are four basic frame types: beacon, management, data, and acknowledgement. Each type of frame may have several subtypes. In addition, the meaning of subtype fields may vary for different frame types. In one embodiment, management frames may have a Frame Type Value of "1," and a Frame Subtype value of "8" may be used to identify the frame as a "power control request" frame, and a Frame Subtype value of "9" may be used to identify the frame as a "power control response" frame. Other Frame Subtype values may be used to identify other types of management frames.

Referring still to FIG. 11B, in an embodiment, a required ACK type field 428 in the frame control field 406 may specify what type of acknowledge frame is expected. For example, the required ACK type field may be set as shown in Table 4 below.

TABLE 4

Values of the Required ACK Type Field 428

| Required ACK Type Value | Type of ACK Required |
| --- | --- |
| 0 | No ACK |
| 1 | Individual ACK |
| 2 | Aggregated ACK |
| 3 | Conditional ACK |
| 4 | Group ACK |
| 5 | Cross-layer ACK |
| 6 | Cross-application ACK |
| 7 | Cross-layer and Cross-application ACK |
| 8 | Fragment incremental ACK (IACK) |

Referring back to FIG. 11A, addressing fields may consist of one or more of a source address, a destination address, a transmitting hop address, and a receiving hop address. Source address and destination address fields may carry the source and destination address of a frame. Transmitting hop address and receiving hop address fields may be reserved for multi-hop scenarios, carrying the address information of the intermediate peers. A transmitting hop address is an address of the peer sending this frame. The receiving hop address is the address of the peer to receive this frame. The presence of a transmitting hop address and/or a receiving hop address field may be indicated by the addressing fields indication.

As shown in FIG. 11A, the MAC frame format 400 may further include an addressing fields indication field 410 that may contain an indication of the presence of a transmitting hop address and a receiving hop address in the addressing fields 412. While a source and destination address may always be present in addressing fields 412, the presence of a transmitting hop address and a receiving hop address may be optional for a multi-hop scenario. For example, for one-hop transmission, neither is present, for the first hop in a multi-hop transmission (i.e., the original source is sending the frame) only a receiving hop address is present and the transmitting hop address is the same as the source address, for the last hop in a multi-hop transmission only a transmitting hop address is present and the receiving hop address is the same as the destination address, and for other hops in a multi-hop transmission, both a transmitting hop address and a receiving hop address are included. In addition, a frame may be a relayed frame when the addressing fields indication is set up as in the last two examples (last hop and other hops).

As further shown in FIG. 11A, a P2PNW/APP ID field 414 field may contain a P2P network ID or application ID. All peers joining a P2P network (NW) may have a locally unique P2PNW/APP ID. If a P2PNW ID is not determined when a frame is sent, this field may carry an application ID. Because a P2PNW may be formed by an application or service, a P2PNW ID may be a network identifier that may be used to define and differentiate an application-specific P2PNW. Due to the distributed nature of proximity services, a P2PNW ID may be locally unique.

A P2PNW ID may include but is not limited to, a CAID or application ID that indicates the desired service or application (e.g., Facebook for social networking, Netflix for video streaming, etc.), location information indicating the location of the P2PNW, an ID of the peer that generated the P2PNW ID, and a network sequence number that may be used to differentiate existing P2PNWs with the same context information. A P2PNW ID may be generated using different structures, such as a concatenated structure where each piece of information is assigned with some information bits and all information pieces are concatenated or a parallel structure where all pieces of information are added together through some mathematical calculation, such as XOR and hash.

Based on different control schemes, a P2PNW ID may be generated and assigned by different parties in the network. In a centralized control scheme embodiment, a P2PNW ID may be generated by a SuperVL that then notifies the VL(s), or a VL may generate the P2PNW ID and broadcast it in a beacon to notify the SuperVL and other VLs. In a hybrid control scheme embodiment, a VL may generate a P2PNW ID and broadcasts it in a beacon to notify other VLs. In a distributed control scheme embodiment, a peer that wants to form a P2PNW (i.e., a peer that defines a new application frame) may generates a P2PNW ID and broadcast a beacon to notify every peer within the proximity of the P2PNW ID.

Still referring to FIG. 11A, an Auxiliary Fields field 416 may contain fields that are optional but important for some functionalities. For example, a context category field may be included that indicates an application or service category, such as emergency service, social networking, smart office, etc. As another example, a hopper indication field may be included that indicates whether a frame sender is willing to relay other frames for a multi-hop discovery process.

As mentioned above, power control request frames (e.g., Frame Type=1; Frame Subtype=8) may be used to request context and power control information within proximity. Table 5 lists some exemplary additional fields that may be provided in the MAC payload (e.g., the Frame Payload field 422 of the MAC Payload 404 of frame format 400) of a power control request frame, in accordance with one embodiment. In one embodiment, the information in Table 5 may be exchanged only once within proximity. Only when any of this information is changed will it be included in a power control request for information exchange. Other power control related information, such as service power category, transmission power, and received signal quality, may be included in one or more CPCI IEs, as further described below.

TABLE 5

Fields in an example Power Control Request Frame

| Field | Description | Mandatory/Option |
|---|---|---|
| Power control interval | Indicate how frequent the sender will start a power control procedure in for the application with the service power category shown in CPCI IE | M |
| Maximum tx power | Upper limit of power level that could be used by the sender. | M |
| Minimum tx power | Lower limit of power level that could be used by the sender. | M |
| Service range | Indicate the typical service radio range for a ProS P2PNW. The service range can vary greatly with different proximity services. For example, the service range for public safety proximity service will be significant larger than the service range of a smart home proximity service. | O |
| Bandwidth | Indicate the bandwidth or subcarriers allocated for the sender in a ProS P2PNW | O |

In an embodiment, a power control response may be sent when a peer receives a power control request message. As described above, a power control response message may provide the power control information of the peer receiving the power control request to the requestor. The information included in a power control response message is similar to the information provided in a power control request.

An Information Element (IE) may provide a flexible, extensible, and easily implementable way to encapsulate information for efficient message exchange. An IE may be either part of a MAC header or a MAC payload. In the example frame format 400 illustrated in FIG. 11A, a field 420 is provided for holding IEs. Multiple IEs may be concatenated in one frame.

Table 6 below lists example fields of an IE for carrying CPCI in a power control request or response frame.

TABLE 6

Fields in CPCI IE

| Field | Description | Mandatory/Option |
|---|---|---|
| IE identifier | Identify the type of IE | M |
| IE length | Indicate the total length of the IE | M |
| Tx power | Indicates the transmission power that is used to send the message | M |
| Service power category | Indicate the sender's power control classification according to the power control requirements for different types of proximity services or applications, such as public safety, social networking, commercial advertisement, sensor network, smart office, etc. | M |
| Rx signal quality or path loss | indicates the received signal quality, e.g., RSSI or the estimated path loss based on the previous transmission between transmitter and receiver | O |
| Power adjustment | Carry the recommendation for the expected receiver on how to adjust the transmission power to make the transmission more reliable | O |

In other embodiments, CPCI information may be carried in an 802.15 or 802.11 beacon frame, having new or modified fields similar to those illustrated in FIG. 11A.

Figure 12A:
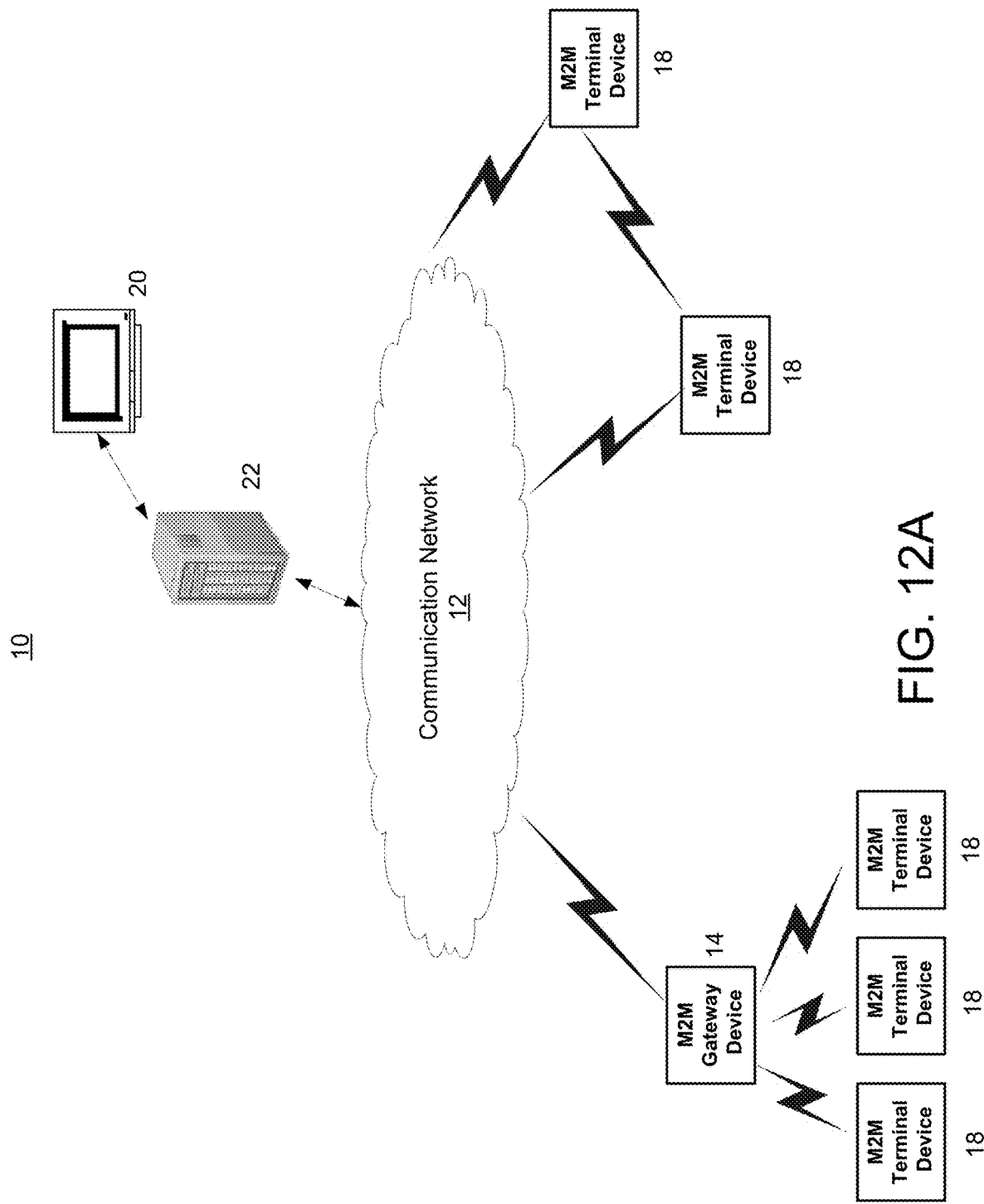
FIG. 12A is a system diagram of an example machine-to-machine (M2M) or Internet of Things (IoT) communication system in which one or more disclosed embodiments may be implemented.

FIG. 12A is a diagram of an example machine-to machine (M2M), Internet of Things (IoT), or Web of Things (WoT)

communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 12A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 12A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18, which may be peers as disclosed above. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link in proximity. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link in proximity, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoW-PAN, Bluetooth), direct radio link in proximity, and wireline for example.

Figure 12B:
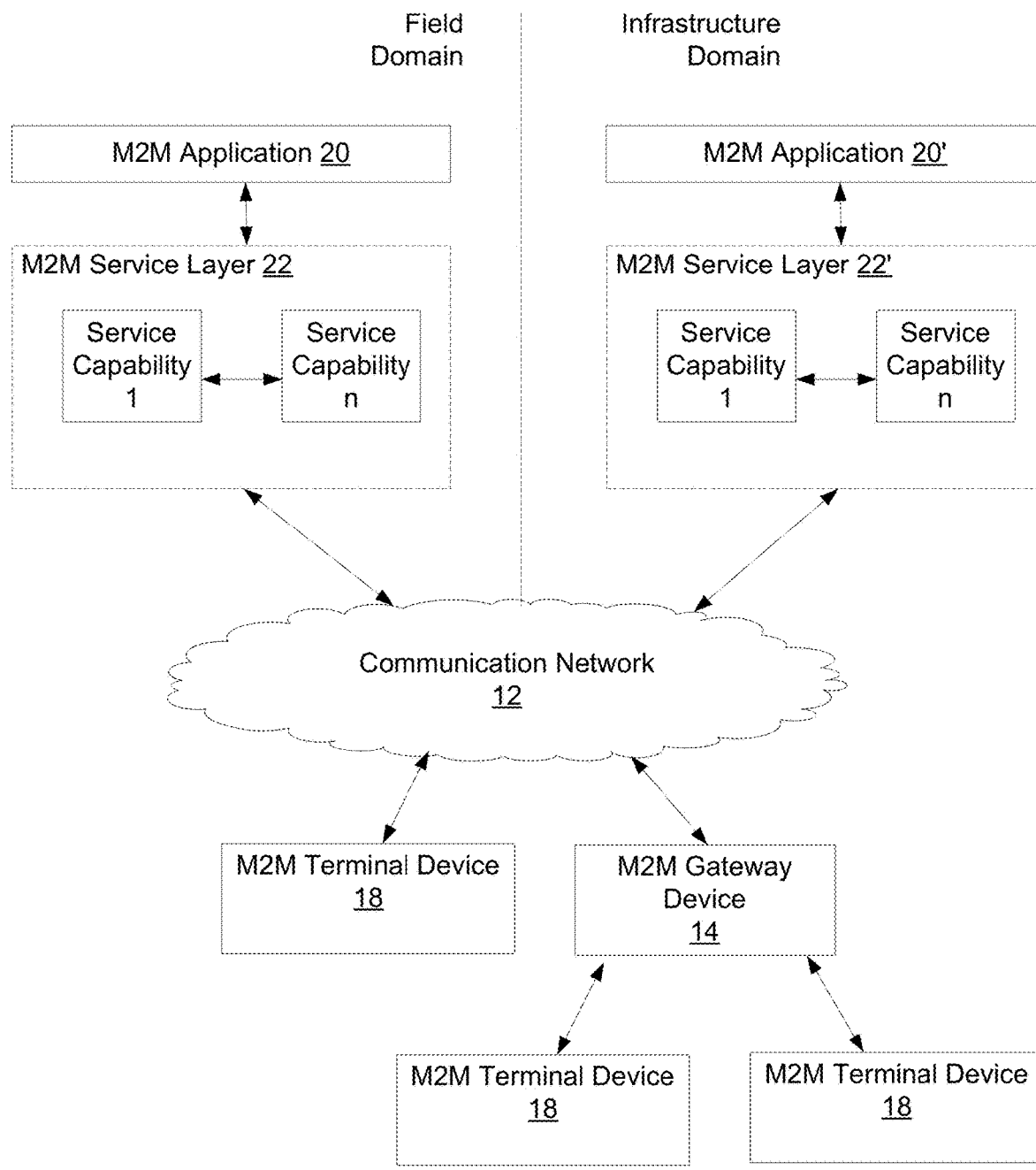
FIG. 12B is a system diagram of an example architecture that may be used within the M2M/IoT communications system illustrated in FIG. 12A.

Referring to FIG. 12B, the illustrated M2M service layer 22 in the field domain provides services for the M2M application 20, M2M gateway devices 14, and M2M terminal devices 18 and the communication network 12. A ProS, as described herein, may be a M2M Application 20 or M2M Service Layer 22. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 12B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some embodiments, M2M applications 20 and 20' may include desired applications that communicate CPCI using context-related power control messages that may include PCReq and PCRes, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Proximity services of the present application may be implemented as part of a service layer. The service layer is a software middleware layer that supports value-added service capabilities through a set of Application Programming Interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain the proximity services of the present invention. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g., infrastructure node, middle node, application-specific node). Further, the context-related power control of the present application can implemented as part of an M2M network that uses a Service Oriented Architecture (SOA) and/or a resource-oriented architecture (ROA) to access services such as the proximity services of the present application.

Figure 12C:
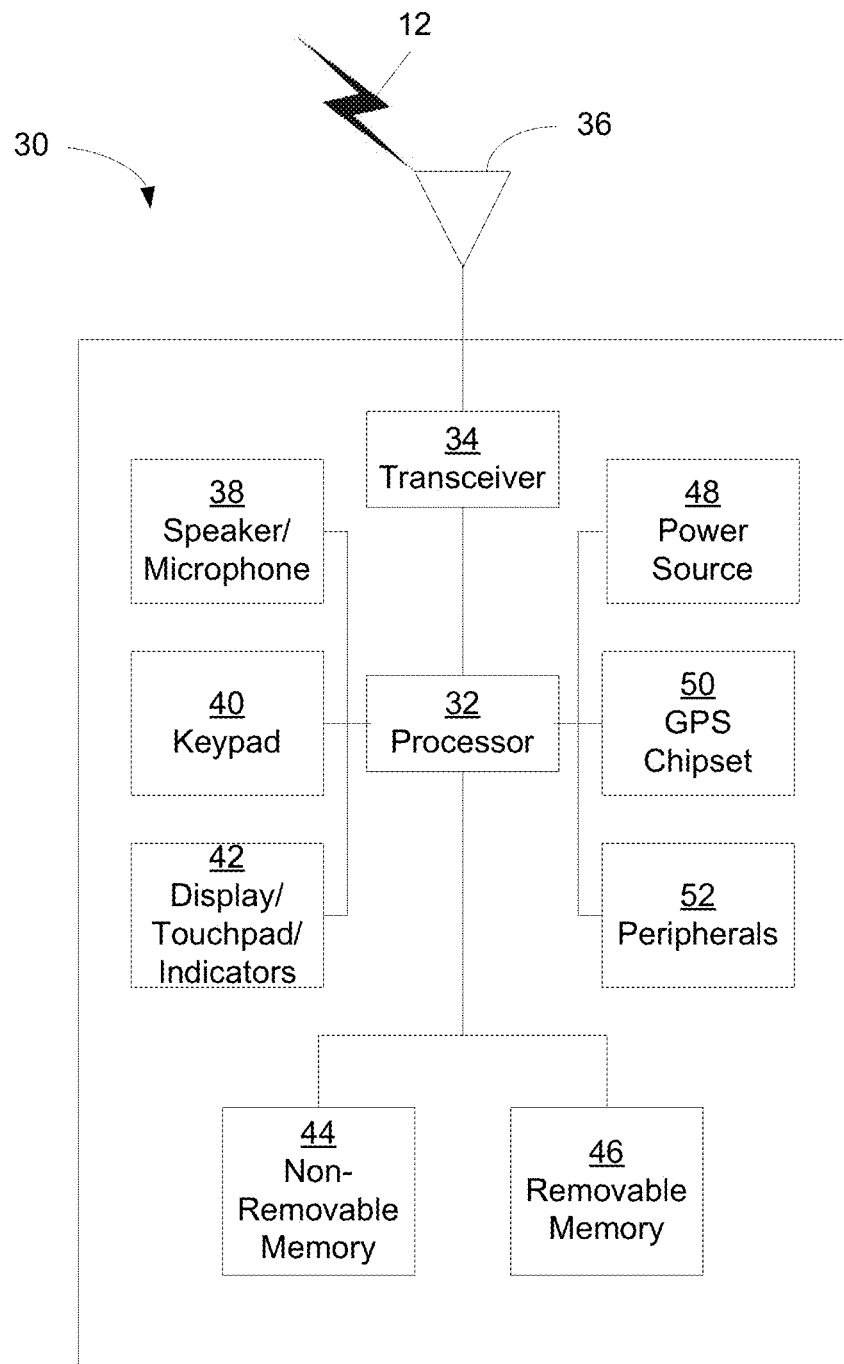
FIG. 12C is a system diagram of an example M2M/IoT terminal or gateway device or a peer that may be used within the communications systems illustrated in FIGS. 2, 3, 5, 12A, and 12B.

FIG. 12C is a system diagram of an example M2M device 30, such as an M2M terminal device 18 or an M2M gateway device 14 shown in FIGS. 12A and 12B, or a peer, such as any one of those illustrated in FIGS. 2, 3, and 5-9. As shown in FIG. 12C, the M2M device or peer 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with an embodiment. This device may be a device that uses the disclosed systems and methods for context-related power control.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 12C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22 or another peer. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 12C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer. The processor 32 may be configured to control lighting patterns, images, or colors on the display or indicators 42 in response to whether the context-related power control (e.g., CPCI information and updates including states such as whether CPCI detection, inter-P2PNWs power control, or inter-P2PNWs power control occurred) in some embodiments described herein are successful or unsuccessful, or otherwise indicative of the status of context-related power control propagation or processing.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 12D:
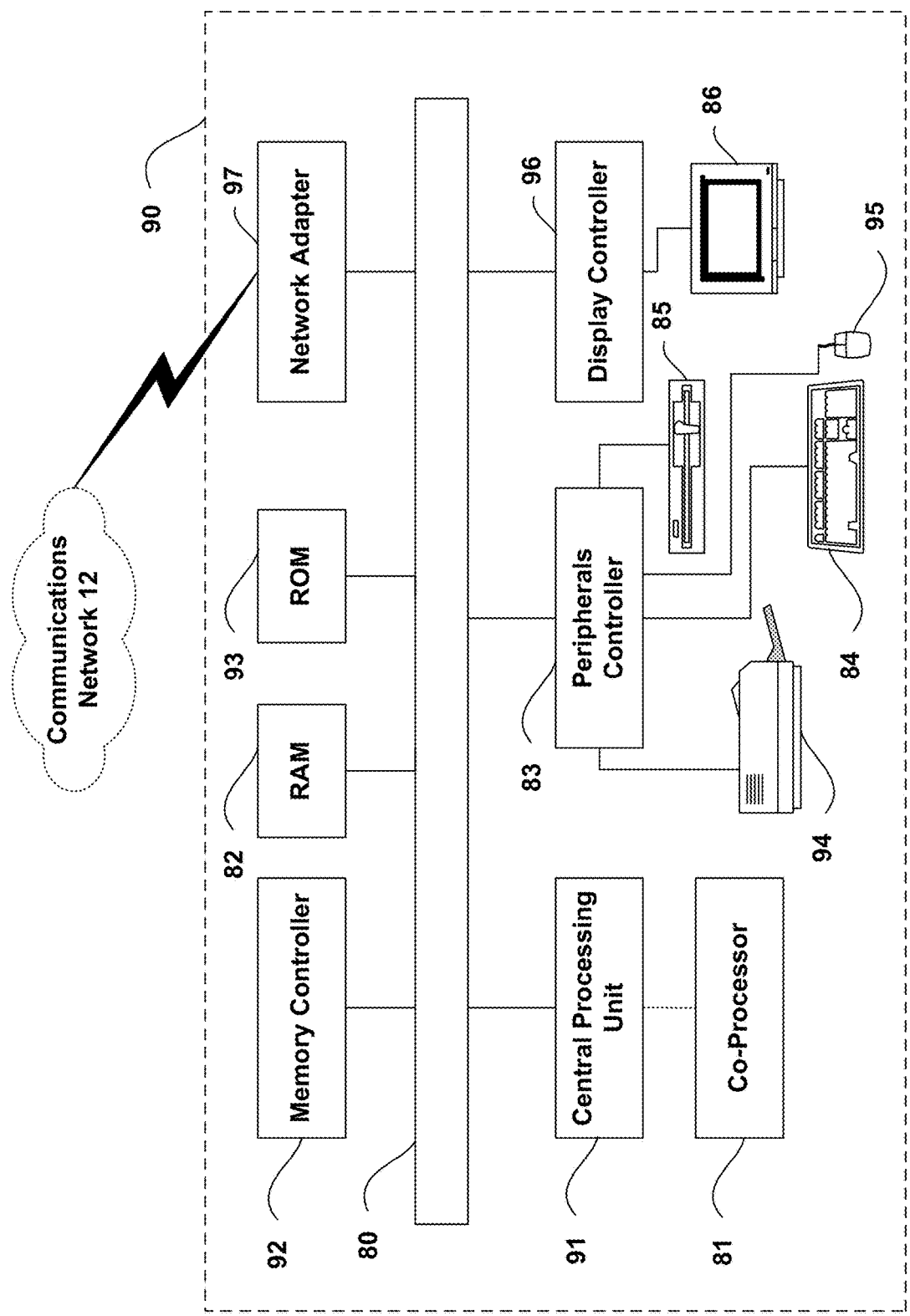
FIG. 12D is a block diagram of an example computing system in which aspects of the communication system of FIGS. 2, 3, 5, 12A, and 12B may be embodied.

FIG. 12D is a block diagram of an exemplary computing system 90 on which, for example, the M2M service platform 22 of FIG. 12A and FIG. 12B may be implemented. As mentioned above, certain peers may also be implemented in the form of computing system 90 or the like. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for context-related power control, such as receiving CPCI and other context-related power control information over the control plane.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 12A and FIG. 12B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, peer, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. One skilled in the art will recognize that the disclosed embodiments may be implemented in architectures and systems, such as 3GPP, ETSI M2M, oneM2M, MQTT, IRTF SDNRG, IRTF P2PRG, IETF COMAN, IEEE 802.11, IEEE 802.15, IEEE 802.16, IEEE 802 OmniRAN, and other M2M capable systems and architectures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A mobile device comprising:
a processor; and
a memory coupled with the processor, the memory having stored thereon executable instructions that when executed by the processor cause the processor to effectuate operations comprising:
executing multiple services on the mobile device, the multiple service comprising a first service and a second service;
while the multiple services are executing on the mobile device at the same time,
obtaining default service information and power control information to control power for transmitting data, wherein the default service information and power control information comprises first default service information and power control information for the first service and second default service information and power control information for the second service, wherein the first default service information and power control information and the second default service information and power control information are different;
detecting scanned service information and power control information to control power for transmitting data, wherein the scanned service information and power control information comprises a first scanned service information and power control information from a first plurality of mobile devices with the first service, a second scanned service information and power control information from a second plurality of mobile devices with the second service, and a third scanned service and power control information from a third plurality of mobile devices with a third service, wherein the first service, second service and third service are different, wherein the scanned service information and power control information is detected from at least one common channel;

measuring signals received from other mobile devices in proximity to obtain measured channel information and power information, wherein the measured channel information and power information comprises a first measured channel information and power information to control power from the first plurality of mobile devices with the first service, a second measured channel information and power information to control power from the second plurality of mobile devices with the second service, and a third measured channel and power information to control power from the third plurality of mobile devices with the third service, wherein the measuring of channel information is associated with measured received signal interference and noise ratio, wherein the measuring power information is associated with power or path loss;

determining a first initial transmit power of the first service and a second initial transmit power of the second service based on the default service information and power control information, the scanned service information and power control information, and the measured channel information and power information; and communicating using the determined first initial transmit power to a first plurality of peer devices with the first service in proximity and second initial transmit power to a second plurality of peer devices with the second service in proximity.

2. The mobile device of claim 1, wherein a mobile device of the first plurality of mobile devices with the first service in proximity is the group lead of the first service network in proximity, a mobile device of the second plurality of mobile devices with the second service in proximity is the group lead of the second service network in proximity, and a mobile device of the third plurality of mobile devices with the third service in proximity is the group lead of the third service network in proximity.

3. The mobile device of claim 1, wherein the default service information and power control information is from a higher layer of the mobile device pre-configured or stored from previous communication sessions, and wherein the service information comprises bandwidth, latency, or speed associated with at least a first service of the multiple services, and the power control information comprises minimum power or maximum power.

4. The mobile device of claim 1, the operations further comprising:

sending, using the first initial transmit power and the second initial transmit power, a first power control request for the first service and a second power control request for the second service, to the first plurality of mobile devices with the first service in which the first plurality of mobile devices are in proximity, a second plurality of mobile devices with the second service in which the second plurality of mobile devices are in proximity, and the third plurality of mobile devices with the third service in which the third plurality of mobile devices are in proximity, wherein the first power control request comprises a request for first service information and power control information for the first service, wherein the second power control request comprises a request for second service information and power control information for the second service, and wherein the first service information and power control information is information to control power for transmitting data for the first service and the second service information and power control information is information to control power for transmitting data for the second service;

based on the sending, receiving a first plurality of responses to the first power control request and a second plurality of responses to the second power control request from the first plurality of mobile devices with the first service in proximity, the second plurality of mobile devices with the second service in proximity, and the third plurality of mobile devices with the third service in proximity, wherein the first plurality of responses or the second plurality of responses comprises the first service information and power control information or the second service information and power control information, wherein the first service information and power control information or the second service information and power control information comprises power level or power adjustment for an associated service; and based on the first service information and power control information or the second service information and power control information:

determining a first transmit power for transmitting data for the first service from the mobile device, and determining a second transmit power for transmitting data for the second service from the mobile device.

5. The mobile device of claim 4, the operations further comprising:

while the multiple services are using multicast and are executing on the mobile device at the same time, providing instructions to transmit:

the data for the first service to the first plurality of mobile devices with the first service at the first transmit power, and the data for the second service to the second plurality of mobile devices with the second service at the second transmit power, wherein the first transmit power and the second transmit power are different, wherein the first transmit power is determined based on the quality of service of the first service, and the second transmit power is determined based on the quality of service of the second service.

6. The mobile device of claim 5, wherein the quality of service corresponds to at least guaranteed service and best effort service.

7. The mobile device of claim 1, the operations further comprising:

sending, using the first initial transmit power and the second initial transmit power, a first power control request for the first service and a second power control request for the second service, to the first plurality of mobile devices with the first service in which the first plurality of mobile devices are in proximity, a second plurality of mobile devices with the second service in which the second plurality of mobile devices are in proximity, and the third plurality of mobile devices with the third service in which the third plurality of mobile devices are in proximity, wherein the first power control request comprises a request for first service information and power control information for the first service, wherein the second power control request comprises a request for second service information and power control information for the second service, and wherein the first service information and power control information is information to control power for transmitting data for the first service and the second service information and power control information is information to control power for transmitting data for the second service;

based on the sending, receiving a first plurality of responses to the first power control request and a second plurality of responses to the second power control request from the first plurality of mobile devices with the first service in proximity, the second plurality of mobile devices with the second service in proximity, and the third plurality of mobile devices with the third service in proximity, wherein the first plurality of responses or the second plurality of responses comprises the first service information and power control information or the second service information and power control information, wherein the first service information and power control information or the second service information and power control information comprises power level or power adjustment for an associated service; and based on the first service information and power control information or the second service information and power control information of the response:

determining a first transmit power for transmitting data for the first service from the mobile device, and determining a second transmit power for transmitting data for the second service from the mobile device;

providing instructions to transmit:

data for the first service to the first mobile device with the first service at the first transmit power, and data for the second service to the second mobile device with the second service at the second transmit power, wherein the first transmit power and the second transmit power are different, wherein the multiple services use unicast while executing on the mobile device at the same time, wherein the unicast is one-to-one communication between two mobile devices with the same service.

8. A method for managing power in a wireless network, the method comprising:

executing multiple services on a mobile device, the multiple service comprising a first service and a second service;

while the multiple services are executing on the mobile device at the same time, obtaining default service information and power control information to control power for transmitting data, wherein the default service information and power control information comprises first default service information and power control information for the first service and second default service information and power control information for the second service, wherein the first default service information and power control information and the second default service information and power control information are different;

detecting scanned service information and power control information to control power for transmitting data, wherein the scanned service information and power control information comprises a first scanned service information and power control information from a first plurality of mobile devices with the first service, a second scanned service information and power control information from a second plurality of mobile devices with the second service, and a third scanned service and power control information from a third plurality of mobile devices with a third service, wherein the first service, second service and third service are different, wherein the scanned service information and power control information is detected from at least one channel;

measuring signals received from other mobile devices in proximity to obtain measured channel information and power information, wherein the measured channel information and power information comprises a first measured channel information and power information to control power from the first plurality of mobile devices with the first service, a second measured channel information and power information to control power from the second plurality of mobile devices with the second service, and a third measured channel and power information to control power from the third plurality of mobile devices with the third service, wherein the measuring of channel information is associated with measured received signal interference and noise ratio, wherein the measuring power information is associated with power and path loss;

determining a first initial transmit power of the first service and a second initial transmit power of the second service based on the default service information and power control information, the scanned service information and power control information, and the measured channel information and power information; and communicating using the determined first initial transmit power to a first plurality of peer devices with the first service in proximity and second initial transmit power to a second plurality of peer devices with the second service in proximity.

9. The method of claim 8, wherein a mobile device of the first plurality of mobile devices with the first service in proximity is the group lead of the first service network in proximity, a mobile device of the second plurality of mobile devices with the second service in proximity is the group lead of the second service network in proximity, and a mobile device of the third plurality of mobile devices with the third service in proximity is the group lead of the third service network in proximity.

10. The method of claim 8, wherein the default service information and power control information is from a higher layer of the mobile device pre-configured or stored from previous communication sessions, and wherein the service information comprises bandwidth, latency, and speed associated with at least a first service of the multiple services, and the power control information comprises minimum power or maximum power.

11. The method of claim 8, further comprising:

sending, using the first initial transmit power and the second initial transmit power, a first power control request for the first service and a second power control request for the second service, to the first plurality of mobile devices with the first service in which the first plurality of mobile devices are in proximity, a second plurality of mobile devices with the second service in which the second plurality of mobile devices are in proximity, and the third plurality of mobile devices with the third service in which the third plurality of mobile devices are in proximity,
wherein the first power control request comprises a request for first service information and power control information for the first service,
wherein the second power control request comprises a request for second service information and power control information for the second service, and
wherein the first service information and power control information is information to control power for transmitting data for the first service and the second service information and power control information is information to control power for transmitting data for the second service;
based on the sending, receiving a first plurality of responses to the first power control request and a second plurality of responses to the second power control request from the first plurality of mobile devices with the first service in proximity, the second plurality of mobile devices with the second service in proximity, and the third plurality of mobile devices with the third service in proximity, wherein the first plurality of responses or the second plurality of responses comprises the first service information and power control information or the second service information and power control information, wherein the first service information and power control information or the second service information and power control information comprises power level and power adjustment for an associated service; and
based on the first service information and power control information or the second service information and power control information:
determining a first transmit power for transmitting data for the first service from the mobile device, and
determining a second transmit power for transmitting data for the second service from the mobile device.

12. The method of claim 11, further comprising:
while the multiple services are using multicast and are executing on the mobile device at the same time, providing instructions to transmit:
the data for the first service to the first plurality of mobile devices with the first service at the first transmit power, and
the data for the second service to the second plurality of mobile devices with the second service at the second transmit power, wherein the first transmit power and the second transmit power are different, wherein the first transmit power is determined based on the quality of service of the first service, and the second transmit power is determined based on the quality of service of the second service.

13. The method of claim 12, wherein the quality of service corresponds to at least guaranteed service and best effort service.

14. The method of claim 8, further comprising:
sending, using the first initial transmit power and the second initial transmit power, a first power control request for the first service and a second power control request for the second service, to the first plurality of mobile devices with the first service in which the first plurality of mobile devices are in proximity, a second plurality of mobile devices with the second service in which the second plurality of mobile devices are in proximity, and the third plurality of mobile devices with the third service in which the third plurality of mobile devices are in proximity,
wherein the first power control request comprises a request for first service information and power control information for the first service,
wherein the second power control request comprises a request for second service information and power control information for the second service, and
wherein the first service information and power control information is information to control power for transmitting data for the first service and the second service information and power control information is information to control power for transmitting data for the second service;
based on the sending, receiving a first plurality of responses to the first power control request and a second plurality of responses to the second power control request from the first plurality of mobile devices with the first service in proximity, the second plurality of mobile devices with the second service in proximity, and the third plurality of mobile devices with the third service in proximity, wherein the first plurality of responses or the second plurality of responses comprises the first service information and power control information or the second service information and power control information, wherein the first service information and power control information or the second service information and power control information comprises power level or power adjustment for an associated service; and
based on the first service information and power control information or the second service information and power control information:
determining a first transmit power for transmitting data for the first service from the mobile device, and
determining a second transmit power for transmitting data for the second service from the mobile device;
providing instructions to transmit:
data for the first service to the first mobile device with the first service at the first transmit power, and
data for the second service to the second mobile device with the second service at the second transmit power, wherein the first transmit power and the second transmit power are different, wherein the multiple services use unicast while executing on the mobile device at the same time, wherein the unicast is one-to-one communication between two mobile devices with the same service.

15. A non-transitory computer readable storage medium storing computer executable instructions that when executed by a computing device cause said computing device to effectuate operations comprising:
executing multiple services on a mobile device, the multiple service comprising a first service and a second service;
while the multiple services are executing on the mobile device at the same time,
obtaining default service information and power control information to control power for transmitting data, wherein the default service information and power control information comprises first default service information and power control information for the first service and second default service information and power control information for the second service, wherein the first default service information and power control information and the second default service information and power control information are different;

detecting scanned service information and power control information to control power for transmitting data, wherein the scanned service information and power control information comprises a first scanned service information and power control information from a first plurality of mobile devices with the first service, a second scanned service information and power control information from a second plurality of mobile devices with the second service, and a third scanned service and power control information from a third plurality of mobile devices with a third service, wherein the first service, second service and third service are different, wherein the scanned service information and power control information is detected from at least one channel;

measuring signals received from other mobile devices in proximity to obtain measured channel information and power information, wherein the measured channel information and power information comprises a first measured channel information and power information to control power from the first plurality of mobile devices with the first service, a second measured channel information and power information to control power from the second plurality of mobile devices with the second service, and a third measured channel and power information to control power from the third plurality of mobile devices with the third service, wherein the measuring of channel information is associated with measured received signal interference and noise ratio, wherein the measuring power information is associated with power and path loss;

determining a first initial transmit power of the first service and a second initial transmit power of the second service based on the default service information and power control information, the scanned service information and power control information, and the measured channel information and power information; and communicating using the determined first initial transmit power to a first plurality of peer devices with the first service in proximity and second initial transmit power to a second plurality of peer devices with the second service in proximity.

16. The non-transitory computer readable storage medium of claim 15, wherein a mobile device of the first plurality of mobile devices with the first service in proximity is the group lead of the first service network in proximity, a mobile device of the second plurality of mobile devices with the second service in proximity is the group lead of the second service network in proximity, and a mobile device of the third plurality of mobile devices with the third service in proximity is the group lead of the third service network in proximity.

17. The non-transitory computer readable storage medium of claim 15, wherein the default service information and power control information is from a higher layer of the mobile device pre-configured or stored from previous communication sessions, and wherein the service information comprises bandwidth, latency, or speed associated with at least a first service of the multiple services, and the power control information comprises minimum power and maximum power.

18. The non-transitory computer readable storage medium of claim 15, the operations further comprising:

sending, using the first initial transmit power and the second initial transmit power, a first power control request for the first service and a second power control request for the second service, to the first plurality of mobile devices with the first service in which the first plurality of mobile devices are in proximity, a second plurality of mobile devices with the second service in which the second plurality of mobile devices are in proximity, and the third plurality of mobile devices with the third service in which the third plurality of mobile devices are in proximity, wherein the first power control request comprises a request for first service information and power control information for the first service, wherein the second power control request comprises a request for second service information and power control information for the second service, and wherein the first service information and power control information is information to control power for transmitting data for the first service and the second service information and power control information is information to control power for transmitting data for the second service;

based on the sending, receiving a first plurality of responses to the first power control request and a second plurality of responses to the second power control request from the first plurality of mobile devices with the first service in proximity, the second plurality of mobile devices with the second service in proximity, and the third plurality of mobile devices with the third service in proximity, wherein the first plurality of responses or the second plurality of responses comprises the first service information and power control information or the second service information and power control information, wherein the first service information and power control information or the second service information and power control information comprises power level and power adjustment for an associated service; and based on the first service information and power control information or the second service information and power control information:

determining a first transmit power for transmitting data for the first service from the mobile device, and determining a second transmit power for transmitting data for the second service from the mobile device.

19. The non-transitory computer readable storage medium of claim 18, the operations further comprising:

while the multiple services are using multicast and are executing on the mobile device at the same time, providing instructions to transmit:

the data for the first service to the first plurality of mobile devices with the first service at the first transmit power, and the data for the second service to the second plurality of mobile devices with the second service at the second transmit power, wherein the first transmit power and the second transmit power are different, wherein the first transmit power is determined based on the quality of service of the first service, and the second transmit power is determined based on the quality of service of the second service.

20. The non-transitory computer readable storage medium of claim 15, the operations further comprising:

sending, using the first initial transmit power and the second initial transmit power, a first power control request for the first service and a second power control request for the second service, to the first plurality of mobile devices with the first service in which the first plurality of mobile devices are in proximity, a second plurality of mobile devices with the second service in which the second plurality of mobile devices are in proximity, and the third plurality of mobile devices with the third service in which the third plurality of mobile devices are in proximity,
 wherein the first power control request comprises a request for first service information and power control information for the first service,
 wherein the second power control request comprises a request for second service information and power control information for the second service, and
 wherein the first service information and power control information is information to control power for transmitting data for the first service and the second service information and power control information is information to control power for transmitting data for the second service;
based on the sending, receiving a first plurality of responses to the first power control request and a second plurality of responses to the second power control request from the first plurality of mobile devices with the first service in proximity, the second plurality of mobile devices with the second service in proximity, and the third plurality of mobile devices with the third service in proximity, wherein the first plurality of responses or the second plurality of responses comprises the first service information and power control information or the second service information and power control information, wherein the first service information and power control information or the second service information and power control information comprises power level and power adjustment for an associated service; and
based on the first service information and power control information or the second service information and power control information:
 determining a first transmit power for transmitting data for the first service from the mobile device, and
 determining a second transmit power for transmitting data for the second service from the mobile device;
providing instructions to transmit:
 data for the first service to the first mobile device with the first service at the first transmit power, and
 data for the second service to the second mobile device with the second service at the second transmit power, wherein the first transmit power and the second transmit power are different, wherein the multiple services use unicast while executing on the mobile device at the same time, wherein the unicast is one-to-one communication between two mobile devices with the same service.

* * * * *